United States Patent
Opshaug et al.

(10) Patent No.: US 11,765,683 B2
(45) Date of Patent: Sep. 19, 2023

(54) DETERMINING A USER EQUIPMENT POSITION WITHIN A COVERAGE SUB-AREA OF A CELL BASED ON CELL IDENTITY DATA

(71) Applicant: QUALCOMM Incorporated, San Diego, CA (US)

(72) Inventors: Guttorm Ringstad Opshaug, Redwood City, CA (US); Grant Marshall, Campbell, CA (US); Rayman Wai Pon, Cupertino, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 172 days.

(21) Appl. No.: 17/233,387

(22) Filed: Apr. 16, 2021

(65) Prior Publication Data

US 2021/0329586 A1 Oct. 21, 2021

Related U.S. Application Data

(60) Provisional application No. 63/012,800, filed on Apr. 20, 2020.

(51) Int. Cl.
H04W 4/00 (2018.01)
H04W 64/00 (2009.01)
H04W 76/11 (2018.01)

(52) U.S. Cl.
CPC .......... *H04W 64/006* (2013.01); *H04W 76/11* (2018.02)

(58) Field of Classification Search
CPC ............................ H04W 64/006; H04W 76/11
See application file for complete search history.

(56) References Cited

U.S. PATENT DOCUMENTS

| | | | | |
|---|---|---|---|---|
| 10,517,061 B1* | 12/2019 | Kumar | .................. | H04W 24/08 |
| 2012/0178473 A1* | 7/2012 | Wiren | .................. | G01S 5/0009 |
| | | | | 455/456.2 |
| 2014/0171105 A1* | 6/2014 | Al-Mufti | ............. | G01S 5/02955 |
| | | | | 455/456.1 |

FOREIGN PATENT DOCUMENTS

| WO | WO 2015046104 | 4/2015 |
|---|---|---|
| WO | WO 2017031384 | 2/2017 |

OTHER PUBLICATIONS

International Search Report and Written Opinion—PCT/US2021/027934—ISA/EPO—dated Sep. 28, 2021.
Partial International Search Report—PCT/US2021/027934—ISA/EPO—dated Aug. 5, 2021.

* cited by examiner

*Primary Examiner* — Justin Y Lee
(74) *Attorney, Agent, or Firm* — Weaver Austin Villeneuve & Sampson LLP

(57) ABSTRACT

Methods, systems, computer-readable media, and apparatuses for determining a UE position within a coverage sub-area of a cell based on cell identity data are presented. In some embodiments, the UE detects one more cell identities, including a cell identity of a serving cell and possibly a cell identity of a neighbor cell of the serving cell. The one or more cell identities are included in cell identity data. The cell identity data is used in a look up of a data structure that associates coverage sub-areas of a coverage area of the serving cell with most likely positions within the coverage sub-areas and with cell identities. The result of the look up indicates that the UE is positioned at a most likely position within a coverage sub-area of the serving cell.

35 Claims, 18 Drawing Sheets

1100

1102
Receive cell identity data, the cell identity data comprising one or more cell identities

1104
Determine a coverage sub-area of the coverage area of the serving cell position of the mobile device based on using the cell identity data in a look up of a data structure, the position being within a coverage sub-area of the coverage area of the serving cell, the data structure associating coverage sub-areas of the coverage area with cell identities, each one of the coverage sub-areas being associated in the data structure with a cell identity of the serving cell, and at least one of the coverage sub-areas being further associated in the data structure with a cell identity of a neighbor cell

1106
Determine a position of the mobile device, the position being within the coverage sub-area of the coverage area of the serving cell

FIG. 11

DETERMINING A USER EQUIPMENT POSITION WITHIN A COVERAGE SUB-AREA OF A CELL BASED ON CELL IDENTITY DATA

RELATED APPLICATIONS

This application claims the benefit of U.S. Provisional Application No. 63/012,800, filed Apr. 20, 2020, entitled "DETERMINING A USER EQUIPMENT POSITION WITHIN A COVERAGE SUB-AREA OF A CELL BASED ON CELL IDENTITY DATA", which is assigned to the assignee hereof, and incorporated herein in its entirety by reference.

BACKGROUND

Aspects of the disclosure relate to positioning user equipment (UE) within a coverage area of a serving cell. The UE can be a wireless mobile device that provides various functionalities to users. Some of these functionalities depend on positioning the UE. For instance, the UE position can be used in support of a cell search, an intra-frequency handover, or a public land mobile network (PLMN) search.

Different techniques are available to determine the UE position. Serving sector centers and mixed cell-sector positioning are examples of such techniques. Generally, the more accurate the position determination is, the higher the quality of service for the position-based functionalities.

BRIEF SUMMARY

Methods, systems, computer-readable media, and apparatuses for determining a UE position within a coverage sub-area of a cell based on cell identity data are presented. In some embodiments, the UE detects one more cell identities, including a cell identity of a serving cell and possibly a cell identity of a neighbor cell of the serving cell. The one or more cell identities are included in cell identity data. The cell identity data is used in a look up of a data structure that associates coverage sub-areas of a coverage area of the serving cell with most likely positions within the coverage sub-areas and with cell identities. The result of the look up indicates that the UE is positioned at a most likely position within a coverage sub-area of the serving cell.

An example method for positioning a mobile device within a coverage area of a serving cell in communication with the mobile device, according to this disclosure, comprises receiving cell identity data, the cell identity data comprising one or more cell identities determining a coverage sub-area of the coverage area of the serving cell based on using the cell identity data in a look up of a data structure, the data structure associating coverage sub-areas of the coverage area with cell identities, each one of the coverage sub-areas being associated in the data structure with a cell identity of the serving cell, and at least one of the coverage sub-areas being further associated in the data structure with a cell identity of a neighbor cell. The method also comprises determining a position of the mobile device, the position being within the coverage sub-area of the coverage area of the serving cell.

An example method for determining cell coverage from crowdsourced information received at a cellular entity of a data communication network, according to this disclosure, comprises obtaining, at the cellular entity, cell identity data and position data for a plurality of positions within a coverage area of a serving cell, wherein the cellular entity comprises a mobile device or computer system, and wherein, for each position the position data includes the respective position, and the cell identity data includes one or more cell identities detected at the respective position of one or more mobile devices. The method also comprises storing, with the cellular entity, the position data and the cell identity data. The method also comprises associating, by the cellular entity using a data structure, coverage sub-areas of the coverage area with cell identities, based on the cell identity data and position data, wherein: each one of the coverage sub-areas is associated in the data structure with a cell identity of the serving cell, and at least one of the coverage sub-areas being further associated in the data structure with a cell identity of a neighbor cell.

An example mobile device for positioning the mobile device within a coverage area of a serving cell in communication with the mobile device, according to this disclosure, comprises a transceiver, a memory, and one or more processing units communicatively coupled with the transceiver and the memory. The one or more processing units are configured to receive cell identity data via the transceiver, the cell identity data comprising one or more cell identities. The one or more processing units are further configured to determine a coverage sub-area of the coverage area of the serving cell based on using the cell identity data in a look up of a data structure, the data structure associating coverage sub-areas of the coverage area with cell identities, each one of the coverage sub-areas being associated in the data structure with a cell identity of the serving cell, and at least one of the coverage sub-areas being further associated in the data structure with a cell identity of a neighbor cell. The one or more processing units are further configured to determine a position of the mobile device, the position being within the coverage sub-area of the coverage area of the serving cell.

An example cellular entity of a data communication network for determining cell coverage from crowdsourced information received at the cellular entity, according to this disclosure, comprises a transceiver, a memory, and one or more processing units communicatively coupled with the transceiver and the memory. The one or more processing units are configured to: obtain, at the cellular entity, cell identity data and position data for a plurality of positions within a coverage area of a serving cell, wherein the cellular entity comprises a mobile device or computer system, and wherein, for each position: the position data includes the respective position, and the cell identity data includes one or more cell identities detected at the respective position of one or more mobile devices. The one or more processing units are further configured to store, with the cellular entity, the position data and the cell identity data. The one or more processing units are further configured to associate coverage sub-areas of the coverage area with cell identities, based on the cell identity data and position data, wherein each one of the coverage sub-areas is associated in the data structure with a cell identity of the serving cell, and at least one of the coverage sub-areas being further associated in the data structure with a cell identity of a neighbor cell.

An example apparatus for positioning a mobile device within a coverage area of a serving cell in communication with the mobile device, according to this disclosure, comprises means for receiving cell identity data, the cell identity data comprising one or more cell identities. The example apparatus further comprises means for determining a coverage sub-area of the coverage area of the serving cell based on using the cell identity data in a look up of a data structure, the data structure associating coverage sub-areas of the coverage area with cell identities, each one of the coverage sub-areas being associated in the data structure with a cell identity of the serving cell, and at least one of the coverage sub-areas being further associated in the data structure with a cell identity of a neighbor cell. The example apparatus further comprises means for determining a position of the mobile device, the position being within the coverage sub-area of the coverage area of the serving cell. Continue here An example apparatus for determining cell coverage from crowdsourced information received at a cellular entity of a data communication network, according to this disclosure comprises means for obtaining, at the cellular entity, cell identity data and position data for a plurality of positions within a coverage area of a serving cell, wherein the cellular entity comprises a mobile device or computer system, and wherein, for each position: the position data includes the respective position, and the cell identity data includes one or more cell identities detected at the respective position of one or more mobile devices. The apparatus further comprises means for storing, with the cellular entity, the position data and the cell identity data. The apparatus further comprises means for associating coverage sub-areas of the coverage area with cell identities, based on the cell identity data and position data, wherein each one of the coverage sub-areas is associated in the data structure with a cell identity of the serving cell, and at least one of the coverage sub-areas being further associated in the data structure with a cell identity of a neighbor cell.

An example non-transitory computer-readable medium, according to this disclosure, stores instructions for positioning a mobile device within a coverage area of a serving cell in communication with the mobile device. The instructions comprise code for receiving cell identity data, the cell identity data comprising one or more cell identities. The instructions further comprise code for determining a coverage sub-area of the coverage area of the serving cell based on using the cell identity data in a look up of a data structure, the data structure associating coverage sub-areas of the coverage area with cell identities, each one of the coverage sub-areas being associated in the data structure with a cell identity of the serving cell, and at least one of the coverage sub-areas being further associated in the data structure with a cell identity of a neighbor cell. The instructions further comprise code for determining a position of the mobile device, the position being within the coverage sub-area of the coverage area of the serving cell.

An example non-transitory computer-readable medium, according to this disclosure, stores instructions for determining cell coverage from crowdsourced information received at a cellular entity of a data communication network. The instructions comprise code for obtaining, at the cellular entity, cell identity data and position data for a plurality of positions within a coverage area of a serving cell, wherein the cellular entity comprises a mobile device or computer system, and wherein, for each position: the position data includes the respective position, and the cell identity data includes one or more cell identities detected at the respective position of one or more mobile devices. The instructions further comprise code for storing, with the cellular entity, the position data and the cell identity data. The instructions further comprise code for associating, by the cellular entity using a data structure, coverage sub-areas of the coverage area with cell identities, based on the cell identity data and position data, wherein: each one of the coverage sub-areas is associated in the data structure with a cell identity of the serving cell, and at least one of the coverage sub-areas being further associated in the data structure with a cell identity of a neighbor cell.

BRIEF DESCRIPTION OF THE DRAWINGS

Aspects of the disclosure are illustrated by way of example. In the accompanying figures, like reference numbers indicate similar elements.

FIG. 11 illustrates an example of a flow for positioning a UE within a coverage area of a serving cell in communication with the UE, in accordance with at least one embodiment.

DETAILED DESCRIPTION

Figure 1:
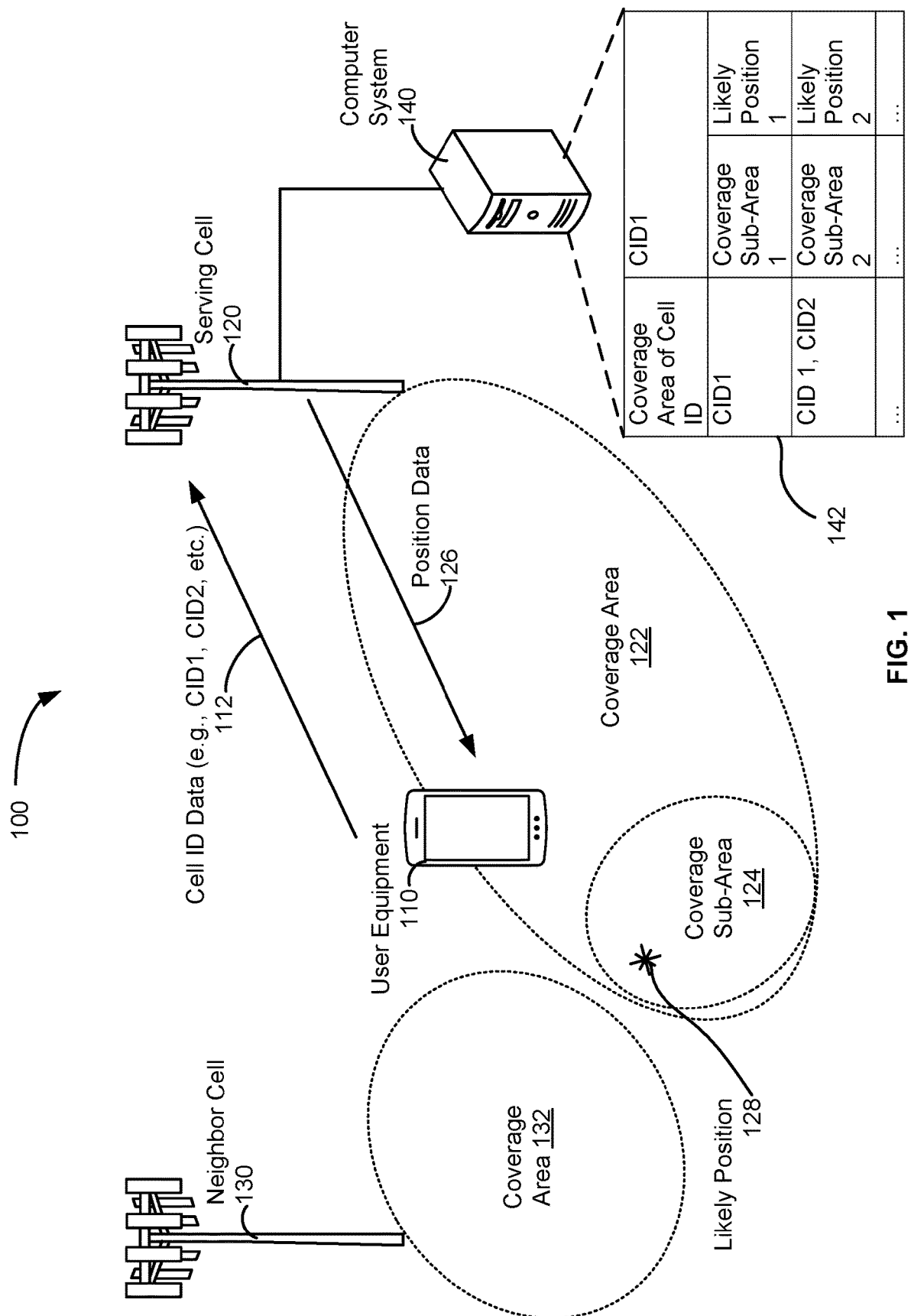
FIG. 1 illustrates an example of a communication system that includes user equipment and multiple cells, in accordance with at least one embodiment.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

As used herein, the term "cell identity" and "cell identity data" may refer to one or more identifiers that can be used to identify and/or distinguish a cell. This may include, for example, a globally unique identifier and/or a locally unique identifier (e.g., physical cell ID). Cell identity data may also include additional identifiers related to a cell. For example, as detailed herein, a cell identity in a 5G network may also include a beam index (or other beam identifier). Because a coverage area of a cell may be divided into different beams, this may provide an additional level of granularity when determining the location of a user equipment (UE).

Embodiments of the present disclosure are directed to, among other things, determining a UE position within a coverage sub-area of a cell based on cell identity data. Generally, a UE can be located within a coverage area of a cell (e.g., the cell is a serving cell and the UE is camped on the serving cell in a connected or mode or is in an idle mode while in the coverage area). At least one neighbor cell may exist. The coverage area of the serving cell can be divided into coverage sub-areas. At least one of the coverage sub-areas can be associated with a cell identity of the neighbor cell and with a most likely position (e.g., a center of the coverage sub-area or some other position as further described herein below). The cell ID and most likely position associations can be stored in a data structure. Depending on the position of the UE within the coverage area, the UE can detect the neighbor cell and determine its cell identity. By using the cell identity in a look up of the data structure, the most likely position within the coverage sub-area can be determined as the position fix of the UE. Hence, and relative to existing UE positioning techniques, the position of the UE can be determined more accurately (e.g., at the higher resolution of a sub-area) without any significant additional overhead, if any (e.g., using cell identities in data structure look ups).

To illustrate, consider an example of a serving cell and two neighbor cells. The coverage area of the serving cell is divided into four coverage sub-areas: a first one associated exclusively with the cell identity of the serving cell, a second one also associated with the cell identity of the first neighbor, cell but not the second neighbor cell, a third one also associated with the cell identity of the second neighbor cell, but not the first neighbor cell, and a fourth one associated with the cell identities of both neighbor cells. Upon detecting only the cell identity of the serving cell, the UE is positioned at the center of first coverage sub-area. Upon detecting the cell identities of the serving cell and the first neighbor cell, the UE is positioned at the center of the second coverage sub-area. Upon detecting the cell identities of the serving cell and the second neighbor cell, the UE is positioned at the center of the third coverage sub-area. Upon detecting all three cell identities, the UE is positioned at the center of the fourth coverage sub-area.

In the interest of clarity of explanation, various embodiments are described herein in connection with a serving cell and one or two neighbor cells. However, the embodiments are not limited as such and can apply to any number of cells. For instance, there can be one serving cell and no neighbor cells (in which case, the coverage sub-area becomes the same as the coverage area of the serving cell). In another illustration, there can be three or a greater number of neighbor cells. Generally, the greater the number of neighbor cells, the greater the number of coverage sub-areas for the serving cell.

FIG. 1 illustrates an example of a communication system 100 that includes a UE 110 and multiple cells including a serving cell 120 and a neighbor cell 130, in accordance with at least one embodiment. The UE 110 may be located within a coverage area 122 of the serving cell 120. The UE 110 can detect a cell identity of the serving cell 120 (referred to as "CID1" in FIG. 1) and, depending on its position within the coverage area 122, a cell identity of the neighbor cell 130 (referred to as "CID2" in FIG. 1). Based on such cell identities, the UE 110 can be positioned within a coverage sub-area 124 of the coverage area 122.

In an example, the serving cell 120 includes network equipment for providing wireless communications according to a radio access technology (RAT). The network equipment includes, among other things, a set of base stations, each of which can include directional antennas. The network equipment can be in communication with or include a computer system 140, such as a server or a gateway that supports various functionalities of the wireless communications.

The coverage area 122 can correspond to the geographic area that is covered by the set of the base stations, to a sector within this geographic area, or timing advance (TA) area within a sector. Generally, the coverage area 122 is associated with the cell identity of the serving cell 120 and the association can be more granular to the level of the sector or TA area as applicable. In addition, the coverage area 122 can be defined for a specific mobile network operator, frequency channel, or RAT. For instance, the set of base stations can cover different frequency channels, each having an absolute radio frequency channel number (ARFCN) or an enhanced ARFCN (EARFCN). Each of the frequency channels can have a corresponding coverage area 122.

As further described in connection with the next figures, the coverage 122 can be divided into multiple coverage sub-areas, among which is the coverage-sub area 124. Each one of the coverage sub-areas represents a smaller portion of the coverage area 122. Each coverage sub-area is associated with a set of cell identities and a most likely position. The associations can be stored in a data structure 142 in a memory of the computer system 140. For instance, the coverage sub-area 124 can be associated with CID 1 and CID 2, and with a particular position fix within the coverage sub-area 124. The data structure 142 can optionally include data defining other characteristics of the coverage area 122 and coverage sub-areas, such as geographical boundaries. Of course, when multiple coverage areas exist (e.g., each for a specific mobile network operator, frequency channel, or RAT), multiple coverage sub-areas can be defined for each one of the coverage areas.

Similarly, the neighbor cell 130 includes network equipment for providing wireless communications within a coverage area 132. The network equipment includes, among other things, a set of base stations, and can be in communication with the computer system 140 or can include or be in communication with another computer system providing the same functionalities of the computer system 140. Although not illustrated in FIG. 1, the coverage area 132 can also be divided into coverage sub-areas and this division can be stored in a data structure, similar to the data structure 142.

The computer system 140 stores the data structure 142 and responds, to look up including one or more cell identities, with position data from the data structure 142. The data structure 142 can be stored as a map having multiple layers, or multiple maps each of which corresponds to a layer. Each layer can correspond to a coverage area, divides such a coverage area into the corresponding coverage subareas, and associates each of such coverage sub-areas with the corresponding cell identity/identities and most likely position. Other types of the data structure 142 are possible including, for instance, a relational database, a table, a string, etc.

Figure 16:
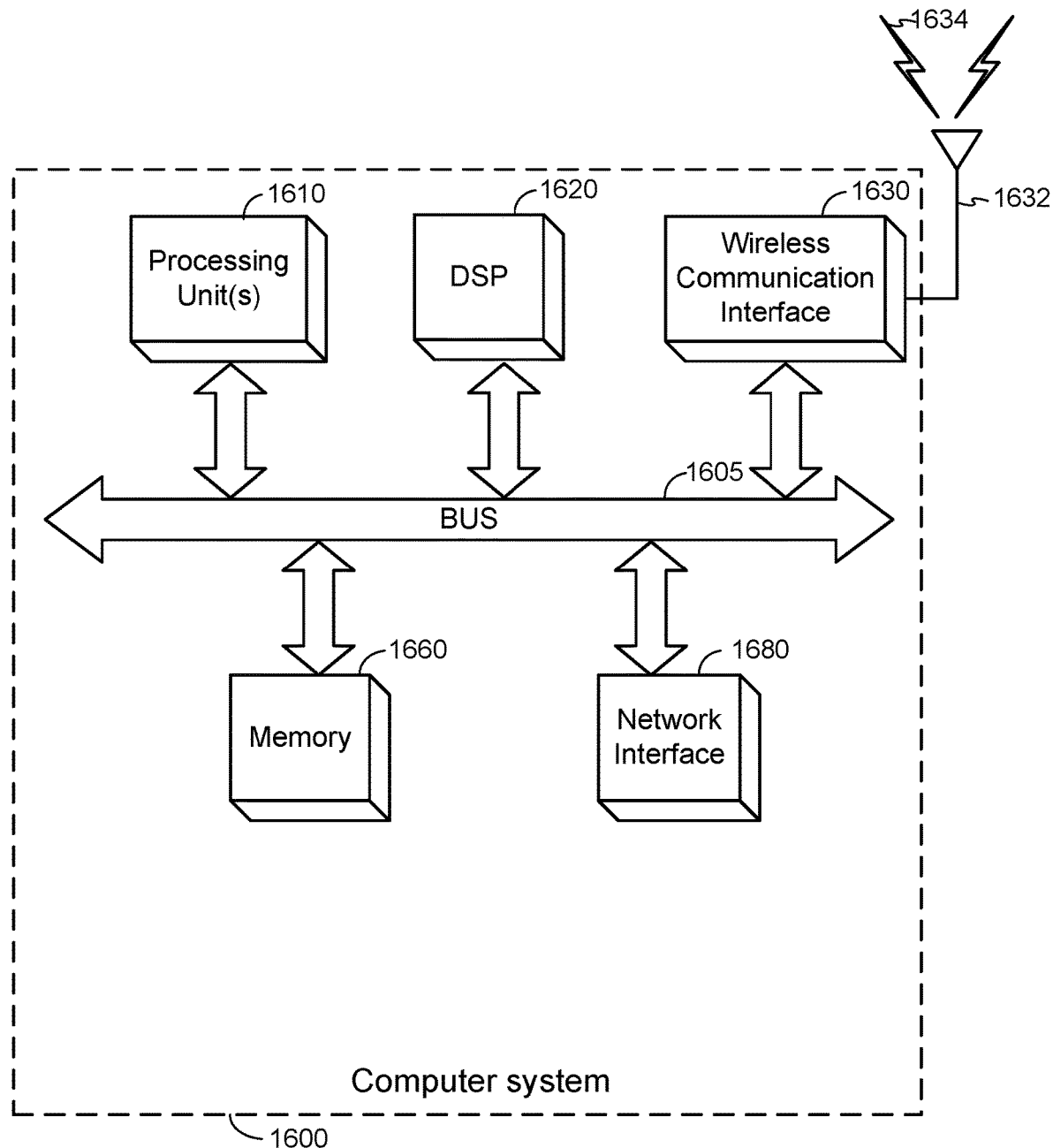
FIG. 16 illustrates an embodiment of a system, which can be utilized as described herein above (e.g., in association with FIGS. 1-13).

In an example, the computer system 140 is a location server that includes a set of processing units, a memory, and a data service module (e.g., a wireless communication interface and/or a network interface) similar to the processing unit(s) 1610, the memory 1660, and the network interface 1680 (and/or wireless communication interface 1630) of FIG. 16. The memory stores program code, that upon execution by the set of processing units, provides location-based services as described herein. In addition, the memory stores the data structure 142 in support of the location-based services. The interface module receives and sends data from and to UEs and other network equipment. The data can include any of cell identity data and position data. The computer system can be a standalone system, can be integrated with a component of the network, or can be distributed between a standalone component and the network. For instance, the computer system can be integrated with a base stations of the serving cell 120, one or more edge servers, a controller (e.g., a software-defined controller (SDN)), or a core network, or can be distributed therebetween. In various embodiments, non-limiting examples of location servers may include mobile positioning systems (MPS), position determination entities (PDE), gateway mobile location centers (GMLC) and serving mobile location centers (SMLC) and various other location determination entities.

In operation, when within the coverage area 122, the UE can detect the cell identity of the serving cell 120 (e.g. CID 1). Depending on its location within the coverage area 122 (e.g., as the UE travels closer to the coverage area 132), the UE can also detect the cell identity of the neighbor cell 130 (e.g. CID 2). The detected cell identity/identities are included in cell identity data 112 sent from the UE 110 to the serving cell 120 (e.g., to a base station thereof). The cell identity data 112 can take the form of a cell identity (CID) measurement report or an enhanced CID (eCID) measurement report containing information about the serving cell 120, and optionally a list of neighbor cells that were also heard when camped on that serving cell 120. The base station can perform a look up of the data structure 142 using the cell identity data 112 to determine the most likely position 128 of the UE 110 within one of the coverage sub-areas of the coverage area 122 and can return the most likely position 128 as position data 126 to the UE 110. For instance, when the cell identity data 112 includes CID 1 and CID 2, the position data 126 indicates a position fix of the UE 110 within the coverage sub-area 124. As further described herein below, this position determination can be local to the UE, whereby the UE 110 can store an instance of the data structure 142 in a memory of the UE 110 and can perform a local look up using the cell identity data 112.

Figure 2:
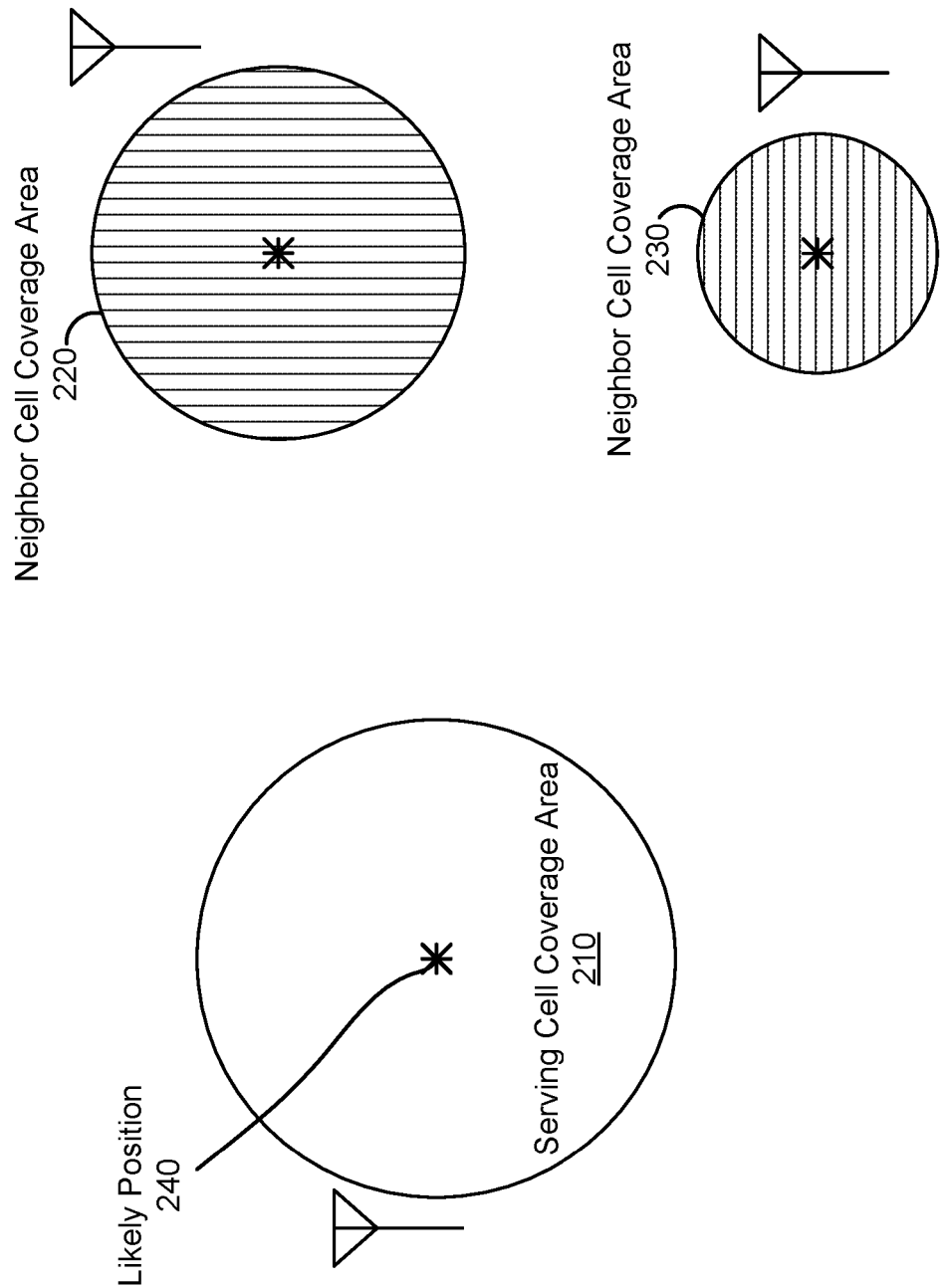
FIG. 2 illustrates an example of positioning a UE using a serving sector technique.

FIG. 2 illustrates an example of positioning a UE using a serving sector technique. According to this technique, the cell identity of the serving cell is used to position the UE, whereas one or more cell identities detected by the UE for one or more neighbor cells can be ignored in the position determination.

In the interest of clarity of explanation, a coverage area of a cell (serving cell or neighbor cell) is illustrated in FIG. 2 and other figures as having a circular shape. However, the coverage area can have any shape (e.g., a triangle or other polygon) and, as described herein above, can be defined for a specific mobile network operator, frequency channel, or RAT.

As illustrated in FIG. 2, a first coverage area 210 is defined for a serving cell on which the UE is camped. A second coverage area 220 (shown with vertical lines) and a third coverage area 230 (shown with horizontal lines) are defined for a first neighbor cell and a second neighbor cell, respectively. Each of the coverage areas 210, 220, and 230 is associated with a most likely position (e.g., a center of the corresponding coverage area and indicated with a star in FIG. 1).

Upon the UE camping on the serving cell, the UE's position is determined as the most likely position associated with the serving cell's coverage area 210 (e.g., the center of the coverage area 210, indicated with a star, and labeled with element number 240). The determination of UE's position does not change while the UE remains camped on the serving cell, even when the UE reports the cell identity of the first neighbor cell, the cell identity of the second neighbor cell, or the cell identities of both neighbor cells. Accordingly, the serving sector technique may result in a less accurate position of the UE relative to other positioning techniques described in the present disclosure.

Figure 3:
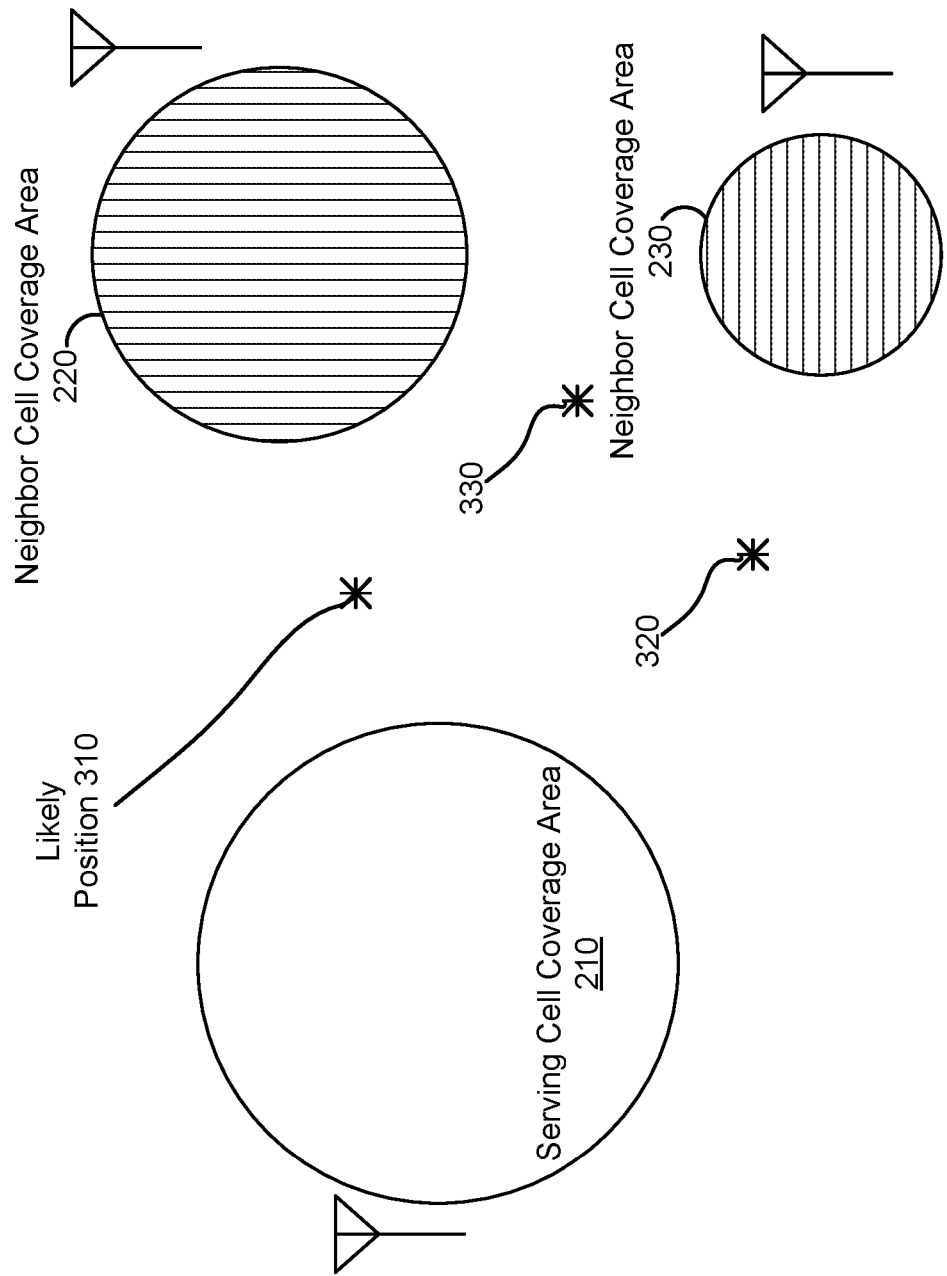
FIG. 3 illustrates an example of positioning a UE using a mixed cell-sector technique.

FIG. 3 illustrates an example of positioning a UE using a mixed cell-sector technique. According to this technique, in addition to the cell identity of the serving cell, one or more cell identities detected by the UE for one or more neighbor cells can also be used to determine the UE's position. To avoid repetition and in the interest of brevity, the same element numbers are used in the figures to refer to the same elements.

According to the mixed cell-sector technique, a position of the UE is determined as a function of cell identities detected by the UE but does not account for coverage sub-areas within the coverage area 210 of the serving cell. For instance, while the UE is camped on the serving cell and reports the cell identity of the first neighbor cell, but not that of the second neighbor cell, the position fix of the UE is determined as a most likely position between the center of the coverage area 210 of the serving cell and the coverage area 220 of the first neighbor cell (illustrated with an upper star and labeled with element number 310). In comparison, when the cell identity of the second neighbor cell is reported instead, the position fix of the UE is determined as a most likely position between the center of the coverage area 210 of the serving cell and the coverage area 230 of the second neighbor cell (illustrated with a lower star 320). When the cell identities of the two neighbor cells are reported, the position fix of the UE is determined as a most likely position between the center of the coverage area 210 of the serving cell, the coverage area 220 of the first neighbor cell, and the coverage area 230 of the second neighbor cell (illustrated with a middle star 330 in between the upper and lower stars).

Referring back to any of the above three illustrations, upon reporting the cell identity of a neighbor cell, the UE's position can be determined to be outside of the coverage area 210 of the serving cell despite the fact that the UE is camped on the serving cell and its position is more likely to be within the coverage area 210. Accordingly, the mixed cell-sector technique may result in a less accurate position of the UE relative to the positioning techniques described herein next the present disclosure.

Figure 4:
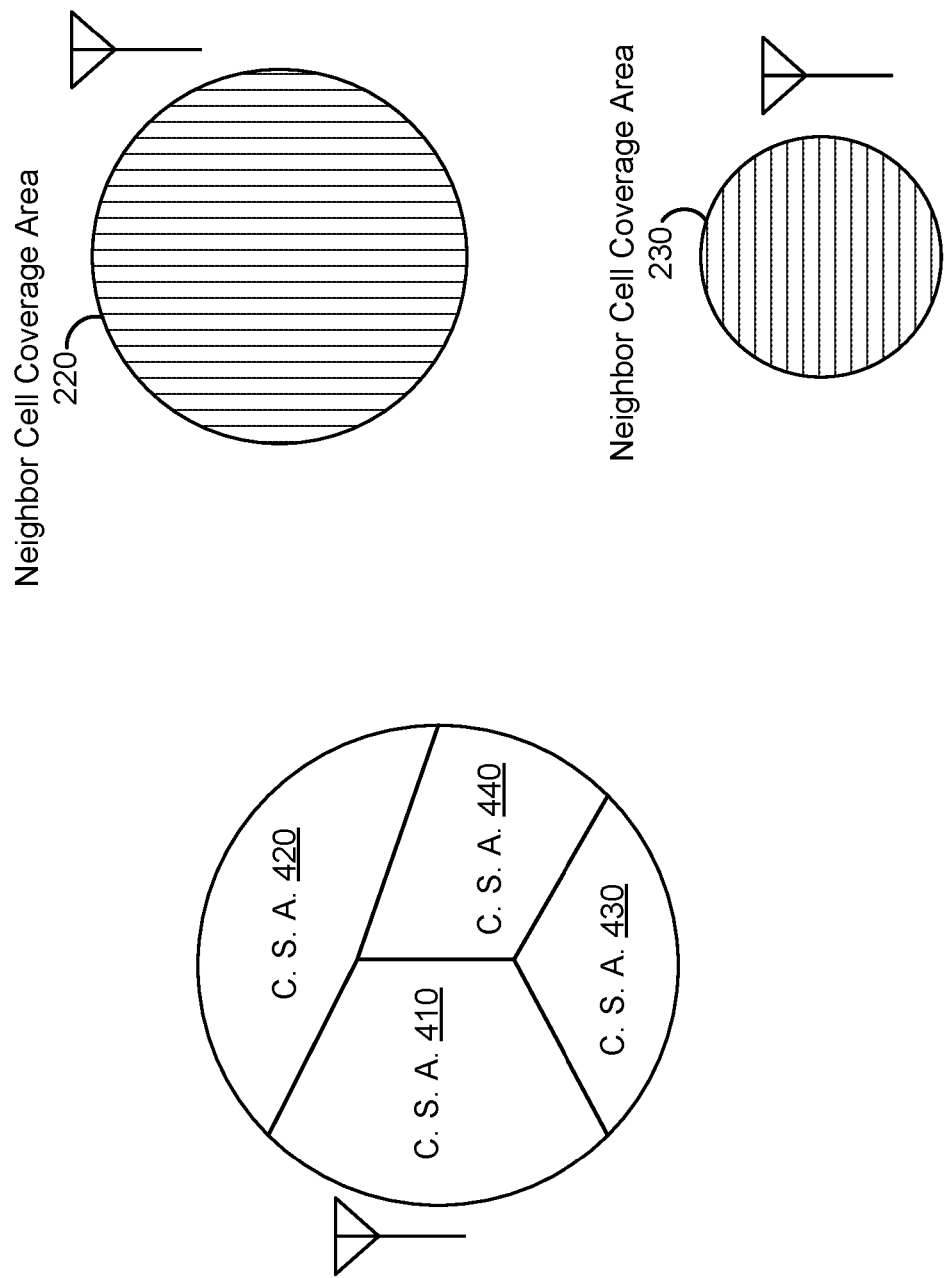
FIG. 4 illustrates an example of coverage sub areas within a coverage area of a cell, in accordance with at least one embodiment.

FIG. 4 illustrates an example of coverage sub-areas 410, 420, 430, and 440 within the coverage area 210 of the serving cell, in accordance with at least one embodiment. The definitions of the coverage sub-areas 410, 420, 430, and 440 (e.g., associations with cell identities, most likely positions and other characteristics such as boundaries) can be stored in a data structure. While the UE is camped on the serving cell, a cell identity-based look up of the data structure results in a most likely position of the UE within one of the coverage sub-areas 410, 420, 430, and 440, which provides a more accurate and granular result than the above positioning techniques without any significant increase, if any, to the processing overhead.

Generally, the greater the number of neighbor cells is, the greater the number of coverage sub-areas is for the serving cell. The coverage sub-areas need not be contiguous and may be overlapping. When overlapping, there can be observations of multiple neighbor cells at the same UE location. When non-overlapping, unique sets of coverage sub-areas can be defined based on unique sets of neighbor combinations. Mathematically, the number C of such coverage sub-areas can be up to:

$$C = 1 + \sum_{M=1}^{N} \frac{N!}{M!(N-M)!},$$

where N is the number of neighbor cells and M=1 to N and these coverage sub-areas need not be contiguous.

Each coverage sub-area can be defined based on the geographic location of the base station(s) of the serving cell and the geographic location of the base station(s) of the corresponding neighbor cell(s) (e.g., their proximities, possible handover boundaries, and/or relative signal strengths within the coverage areas). The definitions can divide the coverage area into sub-areas having a same or different sizes and/or shapes based on the various geographic locations. Each coverage sub-area can be also associated with one or more cell identities and a most likely position. Over time, based on measurements received from multiple UEs, as further described in the next figures, the definition of the coverage sub-areas (including their boundaries and/or most likely positions) can change, whereas the associations with the cell identities typically remain unchanged.

As illustrated in FIG. 4, the first coverage sub-area 410 is associated exclusively with the cell identity of the serving cell. The second coverage sub-area 420 is associated exclusively with the cell identity of the serving cell and the first neighbor cell. The third coverage sub-area 430 is associated exclusively with the cell identity of the serving cell and the second neighbor cell. The fourth coverage sub-area 440 is associated with the cell identity of the serving cell and the two neighbor cells.

As such, when the UE reports that it detected only the cell identity of the serving cell, the UE is positioned within the first coverage sub-area 410. When the UE reports that it additionally detected the cell identity of the first neighbor cell, but not that of the second neighbor cell, the UE is positioned within the second coverage sub-area 420. In comparison, when the UE reports that it additionally detected the cell identity of the second neighbor cell, but not that of the first neighbor cell, the UE is positioned within the third coverage sub-area 430. When the UE reports that it additionally detected the cell identity of the two neighbor cells, the UE is positioned within the fourth coverage sub-area 440. The position fix within each of the coverage sub-areas 410, 420, 430, and 440 can be a most likely position. The most likely position for each one of the coverage sub-areas 410, 420, 430, and 440 can be defined initially as a center of such a coverage sub-area and can be refined subsequently based on measurements reported from multiple UEs as further described in connection with the next figures.

Although not illustrated in FIG. 4, each of the coverage areas 220 and 230 can be divided into coverage sub-areas. The coverage sub-areas of the first neighbor cell can be used in the positioning of the UE when the UE is camped on the first neighbor cell (e.g., this neighbor cell becomes the UE's serving cell). The coverage sub-areas of the second neighbor cell can be similarly used.

Figure 5:
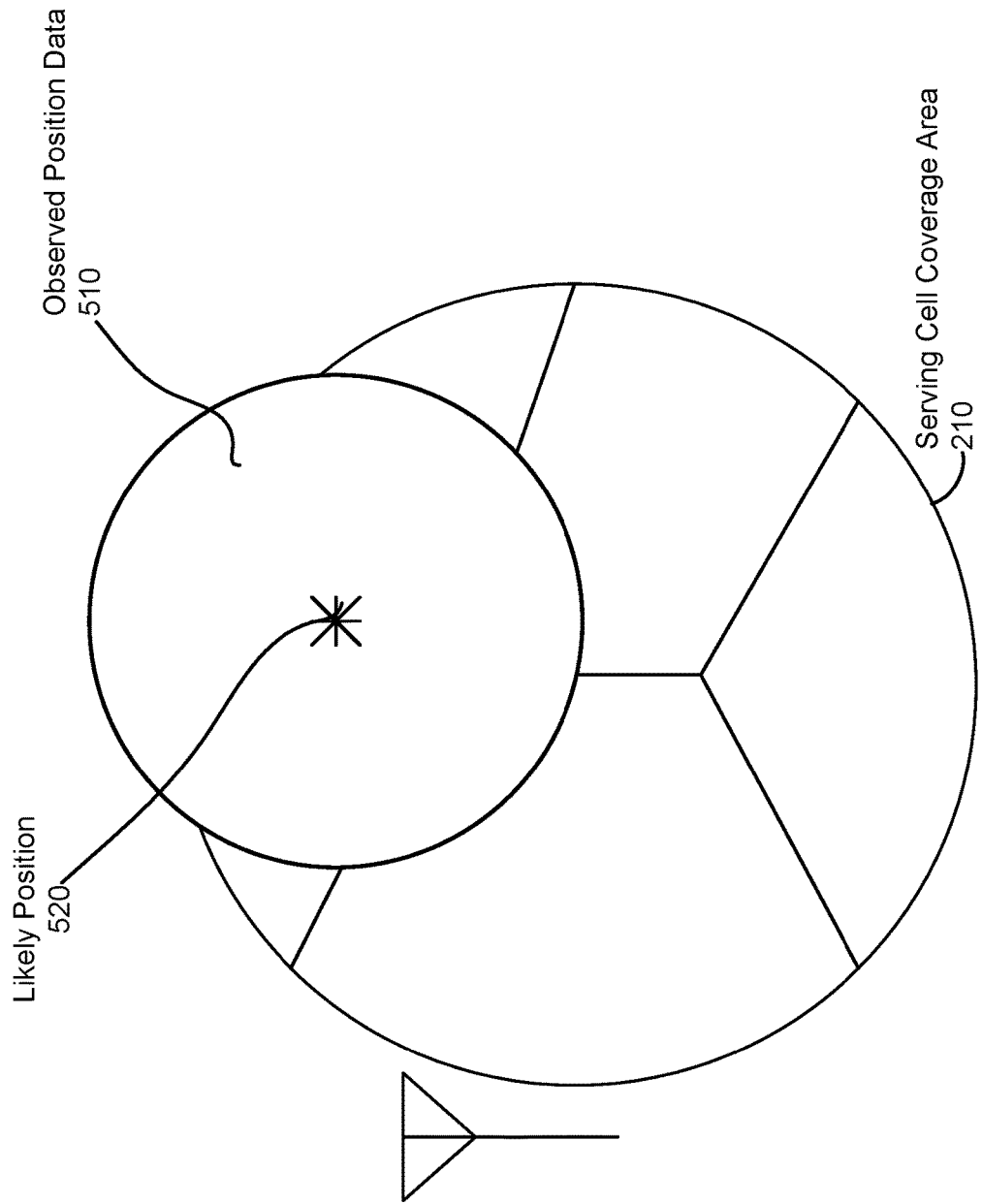
FIG. 5 illustrates an example of positioning a UE using an enhanced mixed cell-sector technique, in accordance with at least one embodiment.

FIG. 5 illustrates an example of positioning a UE using an enhanced mixed cell-sector technique, in accordance with at least one embodiment. According to this technique, the one or more cell identities detected by the UE can be used to position the UE within one of the coverage sub-areas and, specifically, at the most likely position within such a coverage sub-area.

In FIG. 5, only the coverage area 210 of the serving cell and its coverage sub-areas 410, 420, 430, and 440 are shown. In addition, refinements to the definition of the coverage sub-area 420 are shown with a circle overlaid on top of the coverage sub-area 420. The refinements can be based on a statistical analysis of observed position data 510, where such data 410 may have been reported from multiple UEs. Similar refinements can also be defined for the remaining coverage sub-areas 420, 430, and 440, but are not shown in FIG. 5 and their description is not repeated herein to avoid redundancy and in the interest of brevity of explanation.

From each one of the reporting UEs, the observed position data 510 can include the cell identity of the serving cell (e.g., CID 1) and at least the cell identity of the first neighbor cell (e.g., CID 2). This observed position data 510 may also include the cell identify of the second neighbor cell (e.g., CID 3) and this cell identity can, optionally, be filtered out as further described in connection with FIGS. 7A-7C. This observed position data 510 can also include position data of the reporting UE, where the position data can indicate the position of the UE at a high accuracy and can be generated by a position sensor of the UE. For instance, the position data is global position system (GPS) data that the UE measures using its GPS sensor. Additionally or alternatively, the UE's position data may not be reported by the UE and can be determined by the network using some other positioning technique (e.g., multiangulation, multilateration, beaconing, etc.).

Based on the observed position data 510 of the various UEs, a computer system on the network side (e.g., the computer system 140 of FIG. 1) can perform a statistical analysis to determine the set of UEs that detected the serving cell and the neighbor cell and their respective positions. The boundary of the coverage sub-area and the most likely position 520 can be refined based on the statistical analysis. For instance, the boundary can be set to include the positions of a particular percentile of the UE set (e.g., ninety-ninth percentile or some other percentile threshold). The most likely position 520 can be defined as the average position of the positions of the UEs within the UE set.

The refinement of the coverage sub-area can be additionally subject to multiple constraints. A first constraint may limit the boundary of each coverage sub-area to be within the boundary of the coverage area 210. In this way, if the UE is camped on the serving cell and detects a neighbor cell, the UE's position may not be determined to be outside the coverage area 210 (e.g., as in the case of the mixed cell-sector technique described in connection with FIG. 3).

A second constraint may limit the most likely position 520, rather than the boundary of each coverage sub-area of the first constraint, to be within the coverage area 210, regardless of the boundary of the coverage sub-area 420, refined or otherwise. In this way also, if the UE is camped on the serving cell and detects a neighbor cell, the UE's position may not be determined to be outside the coverage area 210.

A third constraint may avoid overlaps between the refined coverage sub-areas. In other words, the coverage sub-areas are non-overlapping, which can avoid inaccurate determinations that a UE is within two different coverage sub-areas.

Figure 6:
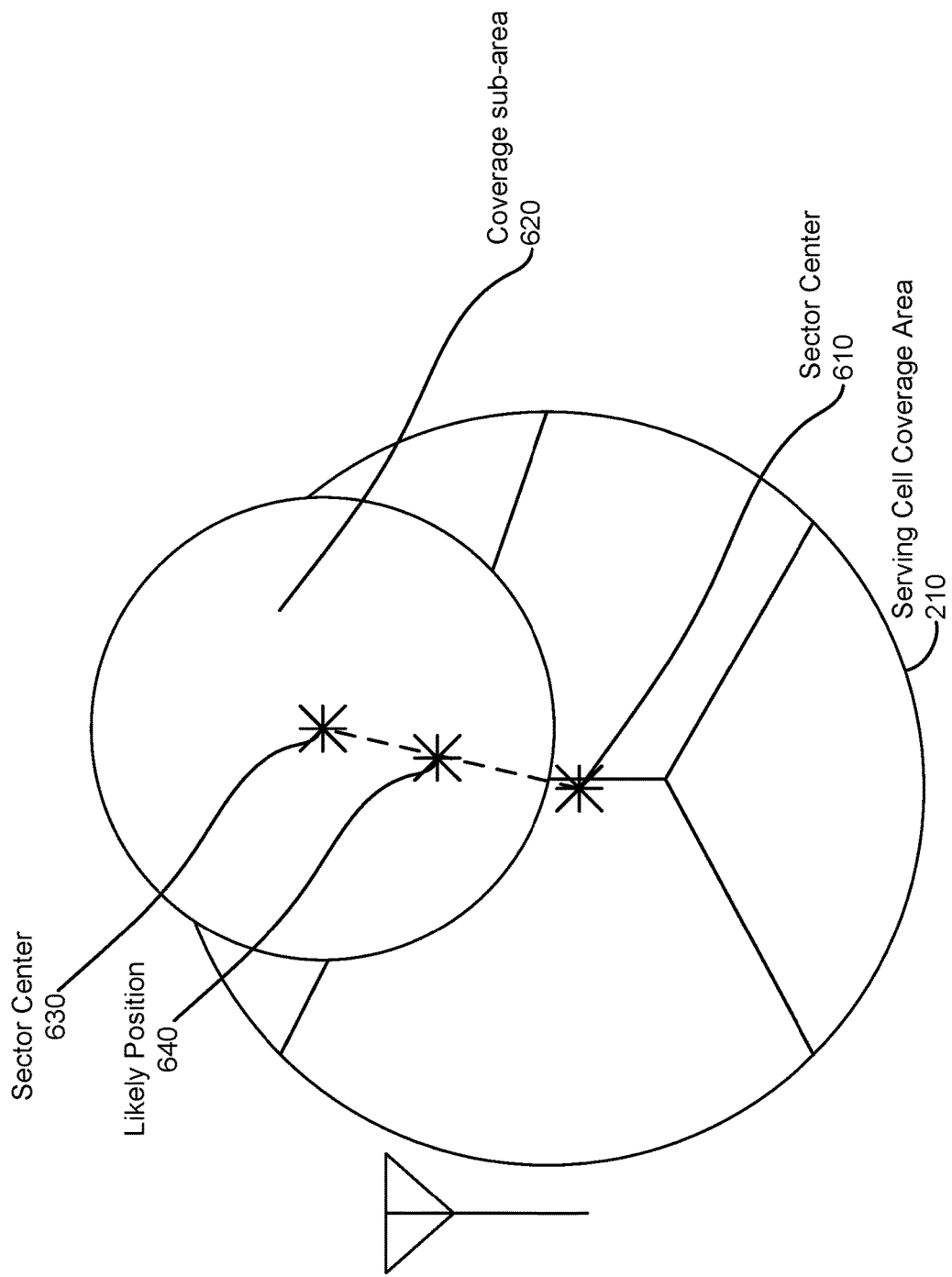
FIG. 6 illustrates another example of positioning a UE using an enhanced mixed cell-sector technique, in accordance with at least one embodiment.

FIG. 6 illustrates another example of positioning a UE using an enhanced mixed cell-sector technique, in accordance with at least one embodiment. According to this technique, the one or more cell identities detected by the UE can also be used to position the UE within one of the coverage sub-areas. However, rather than being the most likely position within such a coverage sub-area, the position fix is a weighted position between likely positions.

In an example, and referring back to the coverage area 210, the coverage area 210 has a sector center 610 (shown with a lower star in the center of the coverage area 210, although it could be positioned somewhere within the coverage area 210 other than the center). Also referring back to the refined coverage sub-area 420 (indicated in FIG. 6 with element 620 and labeled as "coverage sub-area"), the coverage sub-area 620 has a sector center 630. The sector center 630 is shown with an upper star in FIG. 6 and can be the center of the coverage sub-area 620, or as described herein above, can be an average position of the positions of the UEs that reported the cell identity of the first neighbor cell while being camped on the serving cell.

While being camped on the serving cell, and upon the UE reporting the cell identity of the first neighbor cell and not the second neighbor cell, the UE is determined to be within the coverage sub-area 620. The UE's position fix (e.g., a most likely position 640) can be determined as a weighted position between the sector center 610 of the serving cell 210 and the sector center 630 of the coverage sub-area 620. In an example, the weights of the sector centers 610 and 630 can be equal. Accordingly, the most likely position 640 is the average position between the two sector centers 610 and 630. In another example, the weights depend on a number of factors. These factors include any of the size of the coverage sub-area 620 (e.g., area, farthest point from the sector center 630, etc.) relative to the size of the coverage area 210, or characteristic(s) of a signal transmitted from the first neighbor cell and detected by the UE (e.g., strength, time delay, etc.) relative to the characteristic(s) of a signal transmitted from the serving cell and detected by the UE. For instance, the larger the size of the coverage sub-area 620 is, the larger the weight of the sector center 630 is and the smaller the weight of the sector center 610 is, thereby the closer the most likely position 640 is to the sector center 630. In another illustration, the smaller the signal strength is from the first neighbor cell, the smaller the weight of the sector center 630 is and the larger the weight of the sector center 610 is, thereby the closer the most likely position 640 is to the sector center 610.

Figure 7A:
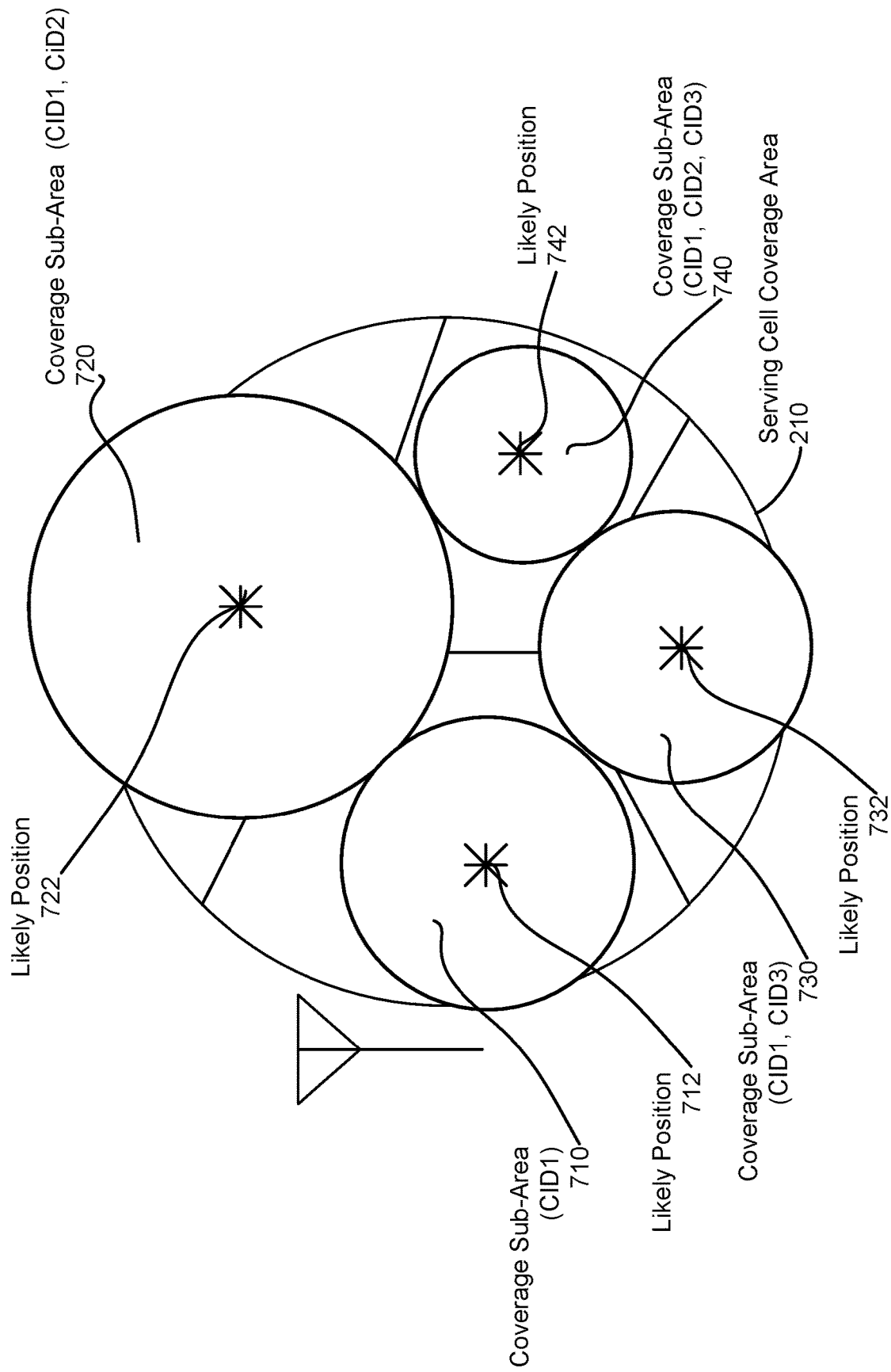
FIGS. 7A-7C illustrates yet another example of positioning a UE using an enhanced mixed cell-sector technique, optionally with beams, in accordance with at least one embodiment.

FIG. 7A illustrates yet another example of positioning a UE using an enhanced mixed cell-sector technique, in accordance with at least one embodiment. In this figure, the coverage area 210 of the serving cell is shown. In addition, the various coverage sub-areas 710, 720, 730, and 740 of the coverage area 210 are shown as circles overlaid over the coverage area 210 to indicate that these have been refined (e.g. correspond to coverage sub-areas 410, 420, 420, and 440) based on measurements reported from various UEs while being camped on the serving cell. Each one of the coverage sub-areas 710, 720, 730, and 740 has a corresponding most likely position 712, 722, 732, or 742 (shown with a star). The definitions of the coverage sub-areas 710, 720, 730, and 740 and their most likely positions 712, 722, 732, and 742 can be derived based on the three constraints described herein above. Additionally or alternatively, a fourth constraint may be used. This fourth constraint may filter the measurements of the UEs based on detected cell identities.

In an example, each of the UE reports is position data and detected cell identities as parts of the collected measurement data. The measurement data can be filtered into sets of data, where the sets are exclusive and do not include overlapping measurement data. A first set includes position data of the UEs that only detected the cell identity of the serving cell (e.g., CID 1). This first set is used in the definition of the first coverage sub-area 710 and its most likely position 712. A second set includes position data of the UEs that only detected the cell identity of the serving cell (e.g., CID 1) and the cell identity of the first neighbor cell (e.g., CID 2). This second set is used in the definition of the second coverage sub-area 720 and its most likely position 722. A third set includes position data of the UEs that only detected the cell identity of the serving cell (e.g., CID 1) and the cell identity of the second neighbor cell (e.g., CID 3). This third set is used in the definition of the third coverage sub-area 730 and its most likely position 732. A fourth set includes position data of the UEs that detected the cell identity of the serving cell (e.g., CID 1) and the cell identities of the two neighbor cells (e.g., CID 2 and CID 3). This fourth set is used in the definition of the fourth coverage sub-area 740 and its most likely position 742.

In an example, the position of the UE can be any of the most likely positions 712, 722, 732, or 742 depending on the one or more cell identities detected by the UE. For instance, while being camped on the serving cell and upon detecting only CID 1 and CID 2, the UE is determined to be within the second coverage sub-area 720 and is positioned at the most likely position 722.

In an example, the position of the UE can be a weighted position between sector center of the coverage area 210 (e.g., the sector center 610 shown in FIG. 6) and any of the most likely positions 712, 722, 732, or 742 depending on the one or more cell identities detected by the UE. For instance, while being camped on the serving cell and upon detecting only CID 1 and CID 2, the UE is determined to be within the second coverage sub-area 720 and is positioned at a weighted position between the sector center 610 and the most likely position 722.

It can be noted that, in 5G wireless systems (e.g., as illustrated in FIG. 18 and described below), embodiments may further leverage different beams of a cell to provide additional granularity with regard to the position of the UE. An example of how this may be applied to the configuration of FIG. 7A is illustrated in FIGS. 7B and 7C.

Figure 7B:
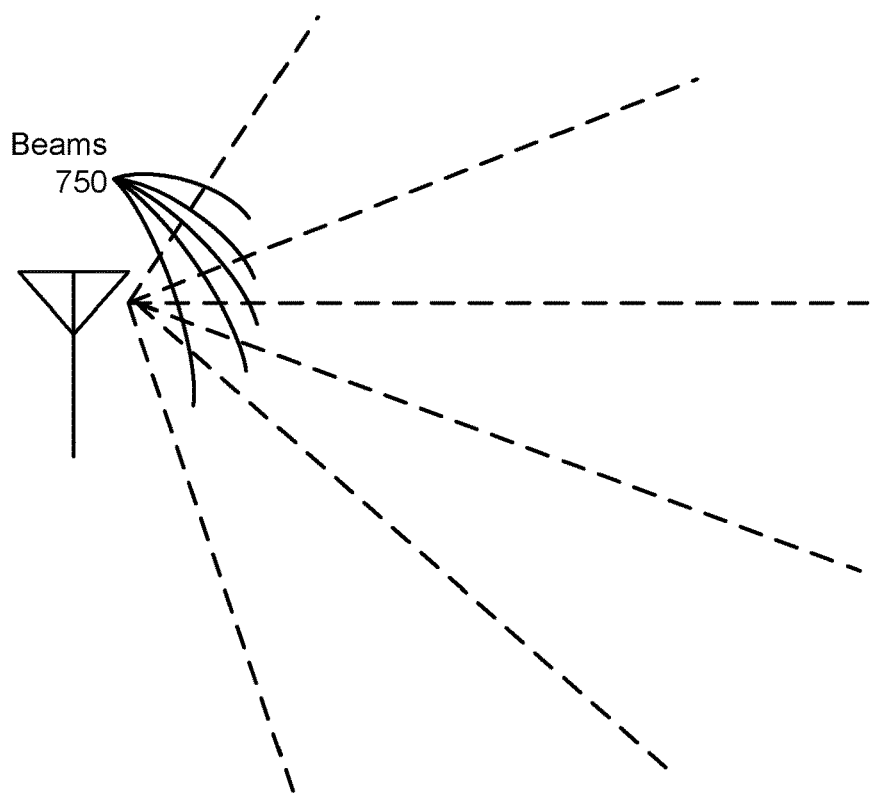

FIG. 7B is a simplified illustration of how a cell may be capable of generating different beams 750, which direct wireless signals along different angles. Beams 750 can be generated using an antenna array, and the number and angular width of beams 750 can vary, depending on desired functionality. (E.g., a cell may generate a different number of beams based on different modes of operation.) Signals transmitted using any of these beams 750 may be associated with a beam index, indicating which beam is used to transmit the signal. Because beams can be identified and associated with different locations within a coverage area of a cell, these locations can be used in conjunction with the techniques provided herein (e.g., in addition to combinations of different cell IDs) to provide additional granularity to the positioning of a UE.

Figure 7C:
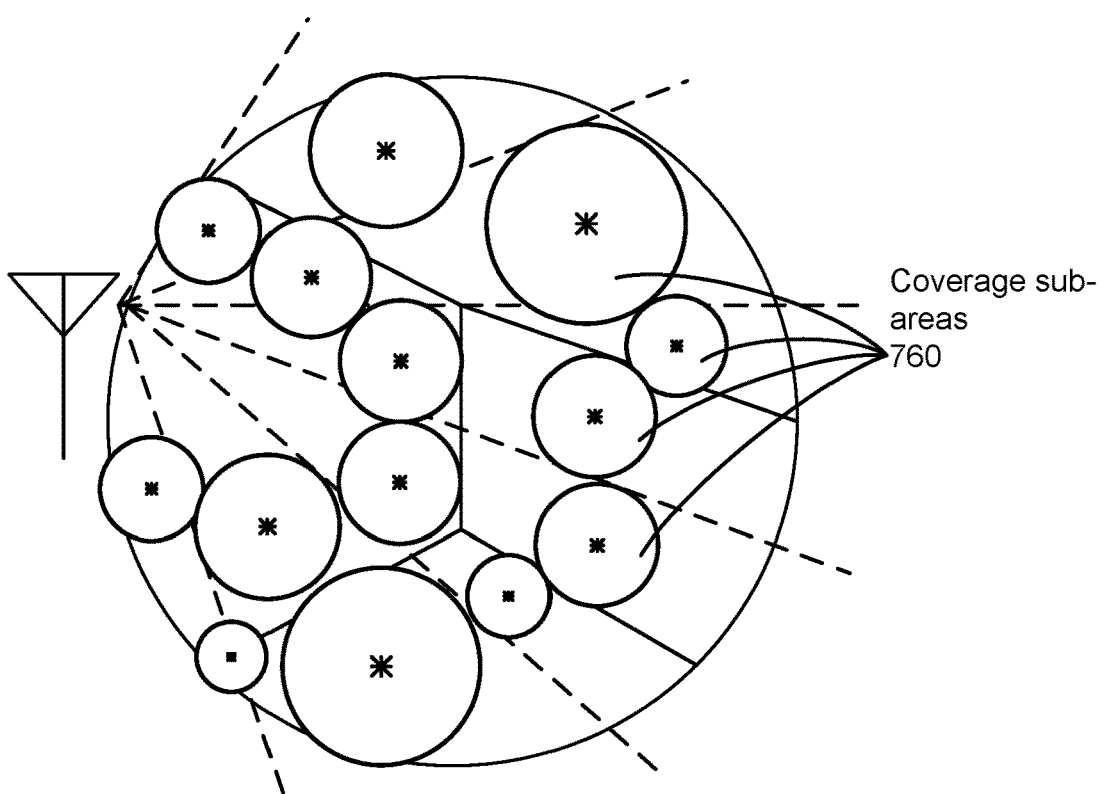

FIG. 7C illustrates an example of how the example illustrated in FIG. 7A can leverage beams to create more granular coverage sub-areas 760 (and corresponding likely positions, represented as a star within each coverage sub-area 760). (To avoid clutter, only a portion of the coverage sub-areas 760 are labeled in FIG. 7C.) Specifically, each coverage sub-area 760 illustrated in FIG. 7C represents a coverage subarea with a unique combination of cellular identity information (e.g., combinations of CID1, CID2, and/or CID3) similar to the coverage subareas of FIG. 7A, additionally constrained in view of the beams of the serving cell.

It can be noted that embodiments additionally or alternatively may utilize beams of neighbor cells. For example, according to some embodiments, coverage sub-areas 760 may be defined based on the beams of the serving cell in addition to the beams of one or more neighbor cells. Alternatively, for example, coverage sub-areas 760 may be defined based on beams of one or more neighbor cells, but not on beams of the serving cell. The beams of different combinations of serving cells may be used, depending on desired functionality, beam availability, etc. As can be seen, where beams of the serving cell and/or neighbor cells are used, embodiments herein may be capable of providing a high degree of granularity with regard to the UE location.

FIGS. 8-13 show illustrative flows related to positioning a mobile device (e.g., a UE) based on one or more cell identities, in accordance with various embodiments. Some or all of instructions for performing the operations of the illustrative flows can be implemented as hardware circuitry and/or stored as computer-readable instructions on a non-transitory computer-readable medium of a network entity comprising the mobile device (e.g., the UE 110 of FIG. 1) or a computer system (e.g., the computer system 140 of FIG. 1). According to different embodiments, the computer system may be located in a Core Network (CN) or Radio Access Network (RAN) of the data communication network. (FIG. 17, described hereafter, includes an example CN (5GC 1740) and an example RAN (NG-RAN 1735).) As implemented, the instructions represent modules that include circuitry or code executable by one or more processors of the mobile device or the computer system, as applicable. The use of such instructions configures the mobile device or the computer system, as applicable, to perform the specific operations described herein. Each circuitry or code in combination with the processor represents a means for performing a respective operation(s). For instance, means for performing the functionality at each operation shown in FIGS. 8-13 may comprise software and/or hardware components of the mobile device, such as the bus 1505, processing unit(s) 1510, DSP 1520, wireless communication interface 1530, memory 1560, and/or other components of the mobile device 1500 illustrated in FIG. 15 and described in more detail below, and/or may comprise software and/or hardware components of a computer system that may be incorporated into a base station or network server. These components may comprise, for example, the bus 1605, processing unit(s) 1610, DSP 1620, wireless communication interface 1630, memory 1660, and/or other components of the computer system illustrated in FIG. 16 and described in more detail below. While the operations are illustrated in a particular order, it should be understood that no particular order is necessary and that one or more operations may be omitted, skipped, performed in parallel, and/or reordered.

Figure 8:
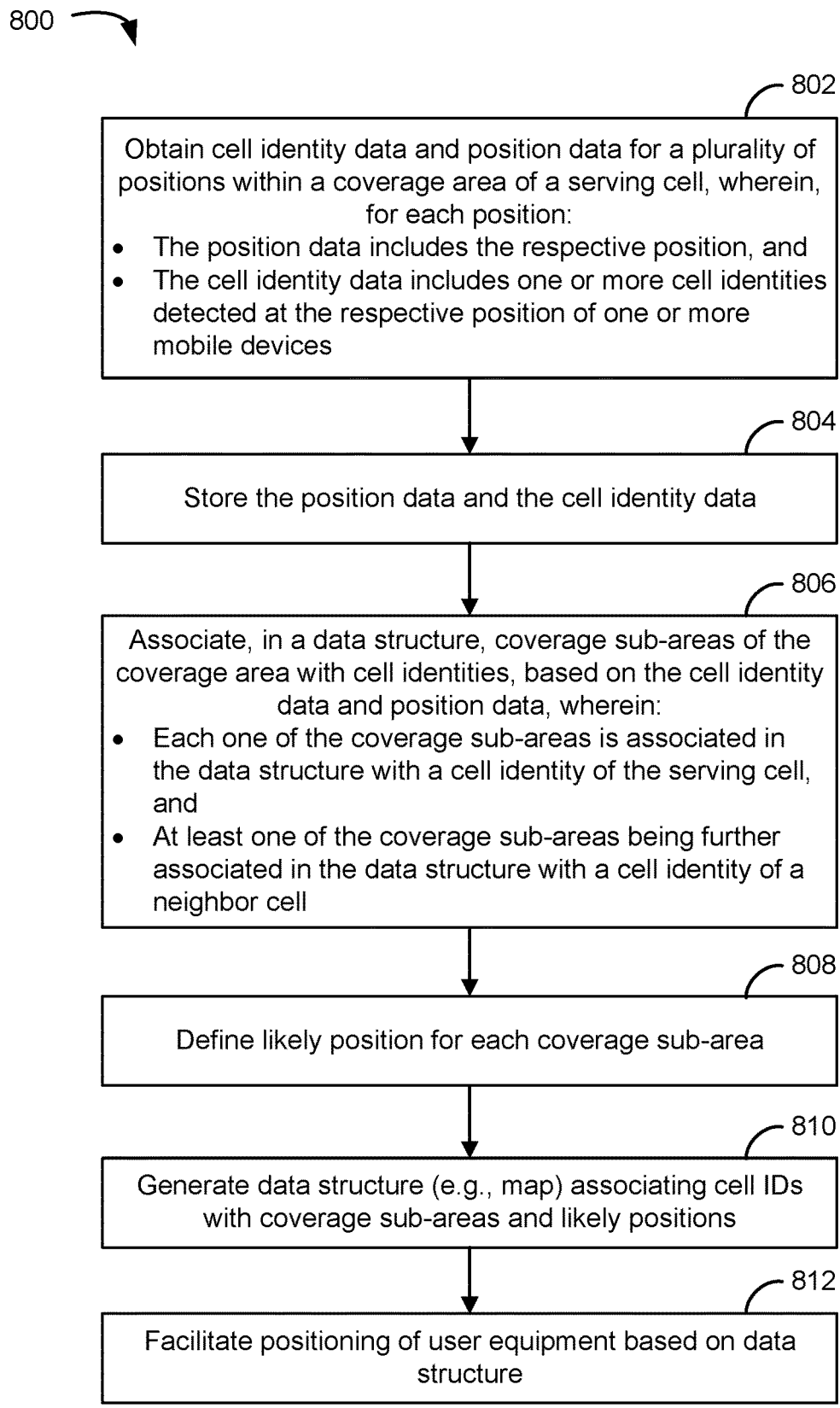
FIG. 8 illustrates an example of a flow for defining coverage sub areas within a coverage area of a cell usable in the positioning of a UE according to an enhanced mixed cell-sector technique, in accordance with at least one embodiment.

FIG. 8 illustrates an example of a flow 800 for determining cell coverage from crowdsourced information received at a cellular entity of a data communication network, in accordance with at least one embodiment. Among other things, the flow 800 provides for defining coverage sub areas within a coverage area of a cell usable in the positioning of a mobile device (e.g., a UE) according to an enhanced mixed-cell sector technique. Means for performing one or more operations illustrated in FIG. 8 may comprise hardware and/or software components of a mobile device or server. For example, a single mobile device may be used to obtain position data at a plurality of locations and generate a data structure based on the position data. Alternatively, a server can receive crowdsourcing information comprising position data from one or more mobile devices at a plurality of positions. In either case, components for performing the flow 800 may comprise or be similar to those illustrated in FIGS. 15 and 16, which are described in more detail below.

As illustrated, the flow 800 starts at operation 802, mobile device where the functionality comprises obtaining cell identity data and position data for a plurality of positions within a coverage area of a serving cell. For each position: (i) the position data includes the respective position, and (ii) the cell identity data includes one or more cell identities detected at the respective position of one or more mobile devices. As noted, this may comprise a single mobile device capturing the state at a plurality of positions. Additionally or alternatively, one or more mobile devices can determine this data and send it to a server. The position can be generated by a position sensor of the mobile device, such as by a GPS sensor. Additionally or alternatively, the position data can be determined from computing resources other than the mobile device, such as by utilizing position multiangulation, multilateration, and/or beaconing. The mobile device can also obtain and send the cell identity of the serving cell and one or more cell identities, if any, corresponding to one or more neighbor cells detected by the mobile device at the position. Thus, according to some embodiments of the flow 800, for at least one position of the plurality of positions, the cell identity data includes a cell identity of the serving cell and a cell identity of at least one the neighbor cell. Depending on desired functionality, the neighbor cell may comprise a different cell than the serving cell and may be on a same frequency channel as the serving cell, a cell on a different frequency channel as the serving cell, a cell on a different radio access technology (RAT) with the same frequency channel as the serving cell, or a cell on a different RAT with a different frequency channel than the serving cell, or any combination thereof At operation 804, functionality comprises storing the position data and the cell identity data. In particular, the position data and cell identity data can be collected from the one or more mobile devices across mobile network operators, frequency channels, RATs, serving cells, and neighbor cells, and the collected data can be stored in a data store, such as a local memory of the device collecting the data (e.g., mobile device or server), or a network-accessible or otherwise remotely-accessible storage location.

At operation 806, the functionality comprises associating in a data structure, coverage sub-areas of the coverage area with cell identities, based on the cell identity data and position data. Each one of the coverage sub-areas is associated in the data structure with a cell identity of the serving cell, and at least one of the coverage sub-areas is further associated in the data structure with a cell identity of a neighbor cell. For instance, for each mobile network operator, frequency channel, or RAT, and for each cell acting as a serving cell, the coverage area of the serving cell may be divided into a number of coverage sub-areas. The number depends on the number of neighbor cells of the serving cell. The boundaries of the coverage sub-areas can depend on the relative locations of the serving cell and the neighbor cells. In addition, the boundaries can be further refined based on statistical analysis of the position data and the cell identity data stored in the data store. The statistical analysis can optionally use any or a combination of the four constraints described herein above.

At operation 808, the functionality comprises defining a most likely position for each coverage sub-area. For instance, the most likely position can be set as a center of the coverage sub-area. In another illustration, the most likely position can be set based on the position data that is stored in the data store and that is associated with the coverage sub-area (e.g., the most likely position is an average of the various positions included in this position data, and/or can be a weighted position).

At operation 810, the functionality comprises generating a data structure associating cell identities with coverage sub-areas and most likely positions. In an example, the data structure can be a map including multiple layers. Each layer corresponds to a mobile network operator, frequency channel, and/or RAT. In a layer, the coverage area of a cell, acting as a serving cell, is identified and associated with the cell identity of this cell. In addition, the coverage sub-areas of the coverage area and their corresponding most likely positions are identified and associated with the cell identity of the serving cell and, as applicable, one or more cell identities corresponding to one or more neighbor cells of the serving cell. As further noted herein, beams may be used to provide additional granularity to sub-areas. Accordingly, in some embodiments, the data structure may further associate coverage sub-areas of the coverage area with a beam index of the serving cell, a beam index of the neighbor cell, or both.

With this in mind, for some embodiments of the flow 800, the data structure may represent a map that (i) divides the coverage area of the serving cell into the coverage sub-areas, (ii) maps each coverage sub-area to a set of cell identities, and (iii) indicates the position of a target mobile device as a likely position within the coverage sub-area, wherein the likely position is determined based on position data collected from the one or more mobile devices while being in the coverage sub-area. According to some embodiments, the map may be associated with at least one of: a mobile network operator, a frequency channel, or a radio access technology. Additionally or alternatively, the coverage sub-area associated with the cell identity of the neighbor cell may be further associated with the likely position, wherein the cell identity data comprises the cell identity of the neighbor cell, and wherein the position is the likely position.

According to some embodiments, the coverage area may be associated with a first likely position, wherein the coverage sub-area associated with the cell identity of the neighbor cell may be further associated with a second likely position. In such embodiments, the cell identity data may comprise the cell identity of the neighbor cell, the position may be within the coverage sub-area associated with the cell identity of the neighbor cell and comprises a likely position determined based on the first likely position and the second likely position. Additionally or alternatively, the coverage sub-areas of the serving cell may comprise a number of unique non-overlapping coverage sub-areas, wherein the data structure associates each of the unique non-overlapping coverage sub-areas with the serving cell and with a unique set of neighbor cells.

According to some embodiments, the data structure may represent a map that (i) divides the coverage area of the serving cell into the coverage sub-areas and (ii) constrains a boundary of each coverage sub-area to be within a boundary of the coverage area. Alternatively, the data structure may represent a map that (i) divides the coverage area of the serving cell into the coverage sub-areas and (ii) constrains a likely mobile device position within each coverage sub-area to be within the coverage area. According to some embodiments, the flow 800 may further comprise storing, for each cell of a plurality of cells, a corresponding data structure that divides a coverage area of the respective cell into coverage sub-areas.

At operation 812, the functionality comprises facilitating positioning of the mobile device based on the data structure. As further described in the next flow figures, this may comprise a server returning a position fix to the mobile device or sending the data structure or a portion thereof to the mobile device to allow the mobile device two locally determine its position fix.

Figure 9:
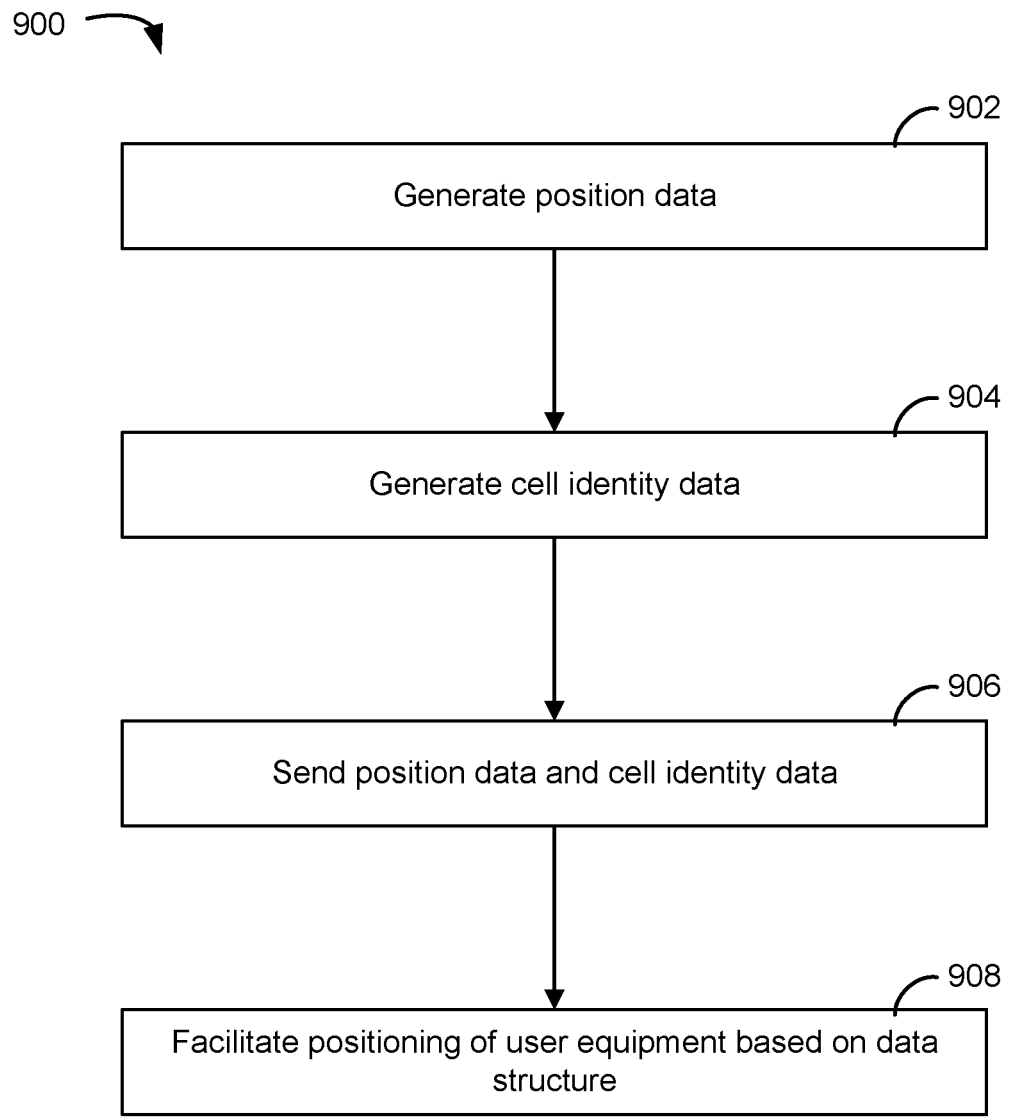
FIG. 9 illustrates an example of a flow for sending relevant position data and cell identity data in support of a definition of coverage sub-areas, in accordance with at least one embodiment.

FIG. 9 illustrates an example of a flow 900 for sending relevant position data and cell identity data in support of a definition of coverage sub-areas, in accordance with at least one embodiment. As illustrated, the flow 900 starts at operation 902, where a mobile device generates position data. For instance, the mobile device is camped on a serving cell and determines its position based on a position sensor of the mobile device.

At operation 904, the mobile device generates cell identity data. For instance, the cell identity data includes the cell identity of the serving cell. In addition, the mobile device can detect a neighbor cell based on a signal transmitted from the neighbor cell. The signal can include a cell identity of the neighbor cell. For each detected neighbor cell, if any, the mobile device includes the corresponding cell identity in the cell identity data.

At operation 906, the mobile device sends the position data and the cell identity data to the computer system. For instance, the mobile device transmits the position data and the cell identity data to a base station of the serving cell and, in turn, the base station relays the position data and the cell identity data to the computer system. The mobile device's transmission can follow a push mechanism or a pull mechanism. In the push mechanism, the mobile device can periodically determine its positions and detected cell identities and automatically transmit the resulting position data and cell identity data. In the pull mechanism, the mobile device responds to a request from the computer system with its position data and cell identity data. Based on the position data and cell identity data received form the mobile device and data similarly received from other mobile devices, the computer system can generate a data structure as described in the flow 800 of FIG. 8.

At operation 908, the mobile device facilitates positioning of the mobile device based on the data structure. As further described in the next flow figures, the mobile device can send cell identity data of currently detected one or more cell identities and receive a position fix from the computer system. Additionally or alternatively, the mobile device can receive the data structure or a portion thereof from the computer system such that the mobile device can locally determine its position fix.

Figure 10:
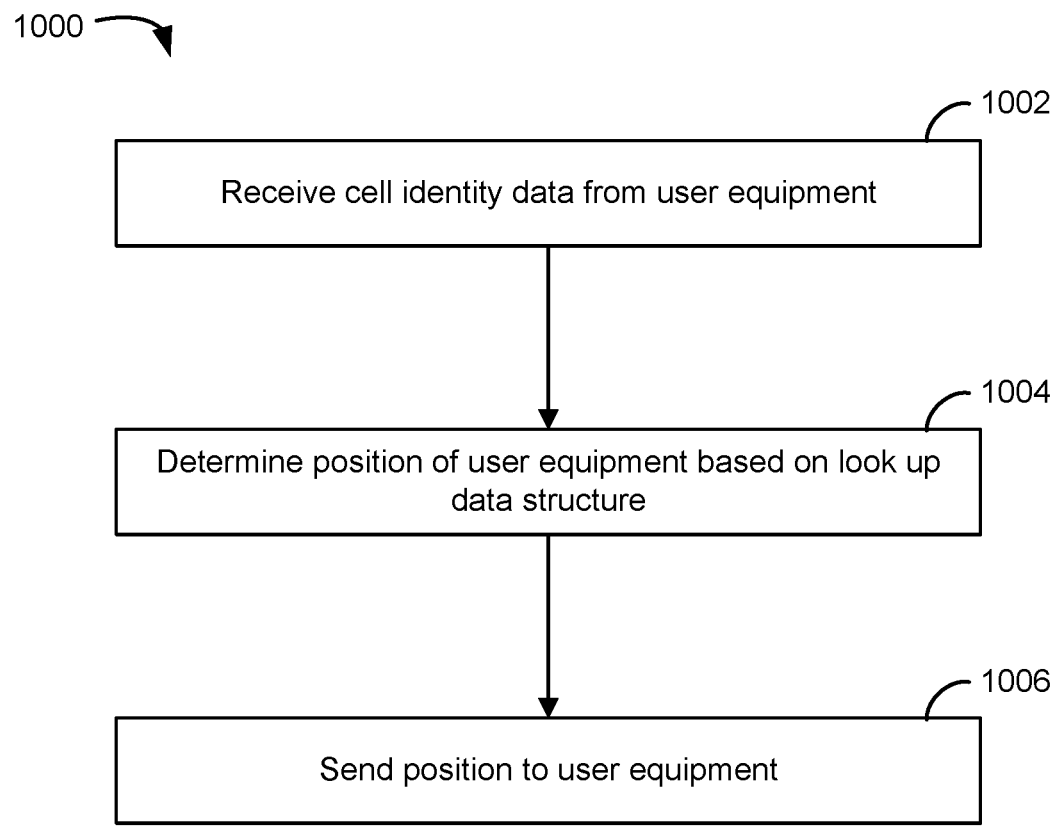
FIG. 10 illustrates an example of a flow for a network-based positioning of a UE based on coverage sub-areas, in accordance with at least one embodiment.

FIG. 10 illustrates an example of a flow 1000 for a network-based positioning of a mobile device based on coverage sub-areas, in accordance with at least one embodiment. As illustrated, the flow 1000 starts at operation 1002, where the computer system receives cell identity data from the user equipment. The cell identity data includes a cell identity of a serving cell on which the mobile device is camped and, as applicable, one or more cell identities corresponding to one or more neighbor cells of the serving cell and detected by the mobile device. The cell identity data can be received according to a pull mechanism or a push mechanism. In an example, the cell identity data is received in a CID or eCID measurement report.

At operation 1004, the computer system determines a position of the user equipment based on a look up of the data structure. For instance, the look up includes the cell identity data (or, more specifically, the cell identity/identities included in the cell identity data). Upon matching an entry of the data structure with the cell identity data, the match indicates a coverage sub-area of the coverage area and the most likely position of the mobile device within the coverage sub-area. The most likely position can be defined, in the data structure, as a center of the coverage area, an average position based on collected mobile device position data, and/or a weighted position.

At operation 1006, the computer system sends the position to the user equipment. For instance, the position is sent as position data.

FIG. 11 illustrates an example of a flow 1100 for positioning a mobile device within a coverage area of a serving cell in communication with the mobile device, in accordance with at least one embodiment. As illustrated, the flow 1100 starts at operation 1102, where the mobile device receives cell identity data. The cell identity data comprises one or more cell identities. For instance, the cell one or more cell identities include a cell identity of the serving cell. Depending on the position of the mobile device within the coverage area, the mobile device can detect one or more neighbor cells of the serving cell, each of which is associated with a cell identity. In this case, the one or more cell identities includes the cell identity of each detected neighbor cell. Generally, the mobile device detects a cell identity of a cell (serving cell or neighbor cell) based on a signal sent from a base station of the cell and received by the mobile device. The signal includes the cell identity.

Means for performing the functionality at operation 1102 may comprise software and/or hardware components of the mobile device, such as the bus 1505, processing unit(s) 1510, DSP 1520, wireless communication interface 1530, memory 1560, and/or other components of the mobile device 1500 illustrated in FIG. 15 and described in more detail below.

At operation 1104, the mobile device determines a coverage sub-area of the coverage area of the serving cell based on using the cell identity data in a look up of a data structure. The data structure associates coverage sub-areas of the coverage area with cell identities. Each one of the coverage sub-areas is associated in the data structure with a cell identity of the serving cell. As noted, each of those coverage sub-areas may also be associated with a beam of the serving cell, the neighbor cell, or both. At least one of the coverage sub-areas is further associated in the data structure with a cell identity of a neighbor cell. Means for performing the functionality at operation 1104 may comprise software and/or hardware components of the mobile device, such as the bus 1505, processing unit(s) 1510, DSP 1520, wireless communication interface 1530, memory 1560, and/or other components of the mobile device 1500 illustrated in FIG. 15 and described in more detail below.

At operation 1106, the mobile device determines a position of the mobile device, the position being within the coverage sub-area of the coverage area of the serving cell. Means for performing the functionality at operation 1106 may comprise software and/or hardware components of the mobile device, such as the bus 1505, processing unit(s) 1510, DSP 1520, wireless communication interface 1530, memory 1560, and/or other components of the mobile device 1500 illustrated in FIG. 15 and described in more detail below.

In an example, the look up at block 1104 is performed by the computer system, where the mobile device sends the cell identity data to the computer system and receives back the position. In this example, the mobile device sends, to the computer system, the cell identity data, where the computer system stores the data structure, and where determining the position of the user equipment comprises receiving the position from the computer system. This computer system-based position look-up is further illustrated in FIG. 12. In another example, look up is performed by the mobile device, where the mobile device sends at least the cell identity of the serving cell, receives the data structure or a portion thereof, performs the look up, and determines the position. In this example, the mobile device stores, in a memory of the mobile device the data structure, and performs the look up of the data structure from the memory. In a variation of this example, the mobile device sends, to the computer system, the cell identity of the serving cell, where the computer system stores, for each cell of a plurality of cells, a corresponding data structure that divides a coverage area of the cell into coverage sub-areas. The mobile device receives, from the computer system and based on the cell identity of the serving cell, the data structure corresponding to the serving cell. This mobile device-based position look-up is further illustrated in FIG. 13.

The mobile device can also be one of the mobile devices that provide position data to generate the data structure. In this case, prior to receiving the cell identity data, the mobile device determines, by a position sensor of the user equipment, position data indicating a second position of the user equipment within the coverage area of the serving cell; receives second cell identity data that comprises the cell identity of the service cell and the cell identity of the neighbor cell; and sends, to the computer system, the position data and the second cell identity data, where the data structure is generated by the computer system based on the position data and the second cell identity data.

In an example, the data structure represents a map that (i) divides the coverage area of the serving cell into the coverage sub-areas, (ii) maps each coverage sub-area to a set of cell identities, and (iii) indicates the position of the user equipment as a likely position within the coverage sub-area. The likely position is determined based on position data collected from a plurality of user equipment while being in the coverage sub-area. In addition, the map is associated with at least one of: a mobile network operator, a frequency channel, or a radio access technology.

In an example, the coverage sub-area associated with the cell identity of the neighbor cell is further associated with a likely position. The cell identity data comprises the cell identity of the neighbor cell, and wherein the position is the likely position.

In an example, the coverage area is associated with a first likely position. The coverage sub-area associated with the cell identity of the neighbor cell is further associated with a second likely position. The cell identity data comprises the cell identity of the neighbor cell. The position is within the coverage sub-area associated with the cell identity of the neighbor cell and is a likely position determined based on the first likely position and the second likely position.

In an example, the coverage sub-areas of the serving cell comprise a number of unique non-overlapping coverage sub-areas, wherein the data structure associates each of the unique non-overlapping coverage sub-areas with the serving cell and with a unique set of neighbor cells. The unique sets of neighbor cells may, but not necessarily, include an empty set of neighbor cells. For instance, the unique non-overlapping coverage sub-areas comprise a first coverage sub-area associated with the serving cell and the neighbor cell and a second coverage sub-area associated with the serving cell and no neighbor cell. In this example, the second coverage sub-area is defined based on first data of a first plurality of user equipment, wherein the third coverage sub-area is defined based on second data of a second plurality of user equipment. The first data comprises first user equipment positions and the cell identity of the neighbor cell, wherein the first data excludes a cell identity of another neighbor cell. The second data comprises second user equipment positions, the cell identity of the neighbor cell, and the cell identity of the other neighbor cell.

In an example, the data structure represents a map that (i) divides the coverage area of the serving cell into the coverage sub-areas and (ii) constrains a boundary of each coverage sub-area to be within a boundary of the coverage area.

In an example, the data structure represents a map that (i) divides the coverage area of the serving cell into the coverage sub-areas and (ii) constrains a likely user equipment position within each coverage sub-area to be within the coverage area.

In an example, the data structure represents a map that divides the coverage area of the serving cell into the coverage sub-areas, and wherein the coverage sub-areas are non-overlapping.

In an example, the neighbor cell is at least one of: a different cell than the serving cell and is on a same frequency channel as the serving cell, a cell on a different frequency channel as the serving cell, or a cell on a different RAT with the same frequency channel as the serving cell, or a cell on a different RAT with a different frequency channel than the serving cell.

Figure 12:
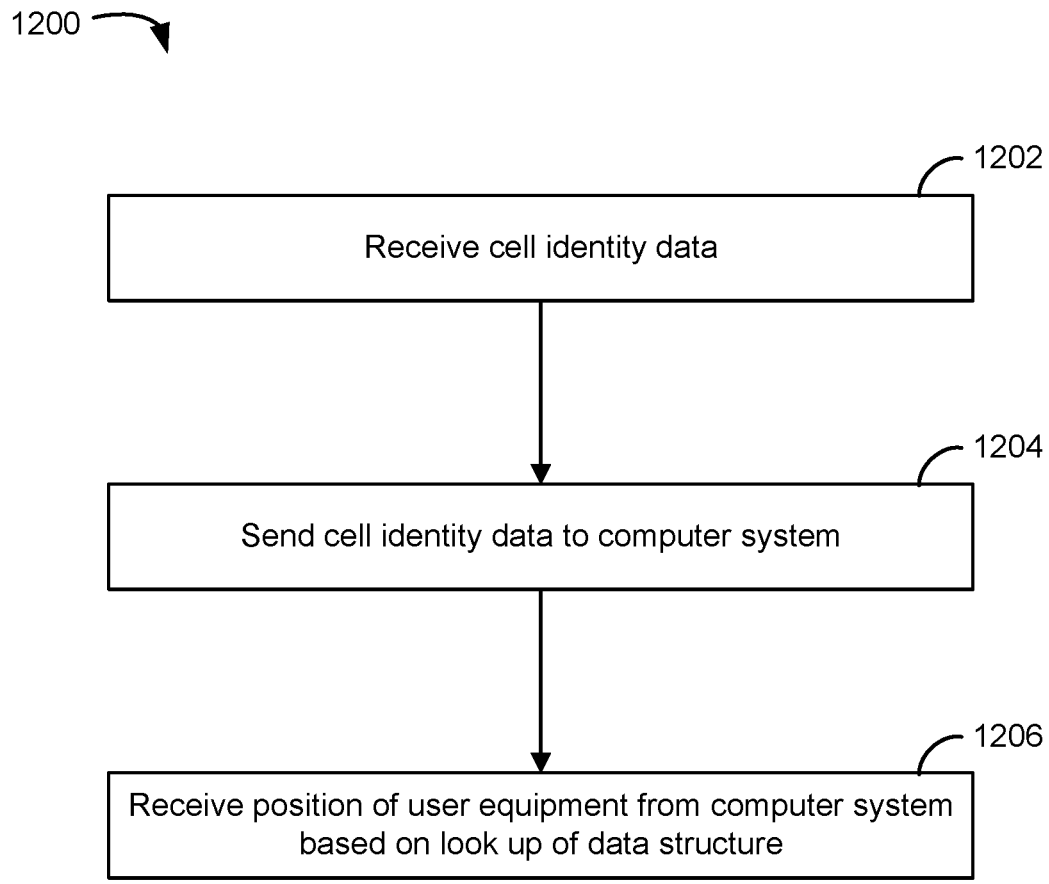
FIG. 12 illustrates an example of a flow for a UE-based positioning of a UE based on coverage sub-areas, in accordance with at least one embodiment.

FIG. 12 illustrates an example of a flow 1200 for a mobile device-based positioning of a mobile device based on coverage sub-areas, in accordance with at least one embodiment. As illustrated, the flow 1200 starts at operation 1202, where the mobile device receives cell identity data. The cell identity data includes a cell identity of a serving cell on which the mobile device is camped and, as applicable, one or more cell identities corresponding to one or more neighbor cells of the serving cell and detected by the mobile device. The one or more cell identities can be determined from corresponding signals transmitted by the neighbor cell(s) and received by the mobile device.

At operation 1204, the mobile device sends the cell identity data to the computer system. The cell identity data can be sent according to a pull mechanism or a push mechanism. In an example, the cell identity data is sent in a CID or eCID measurement report.

At operation 1206, the mobile device receives its position from the computer system based on a look up of the data structure by the computer system. The look up is similar to the operation 1004 of the flow 1000 of FIG. 10 and uses the cell identity data sent at operation 1204. The position can be received as position data in response to sending the cell identity data.

Figure 13:
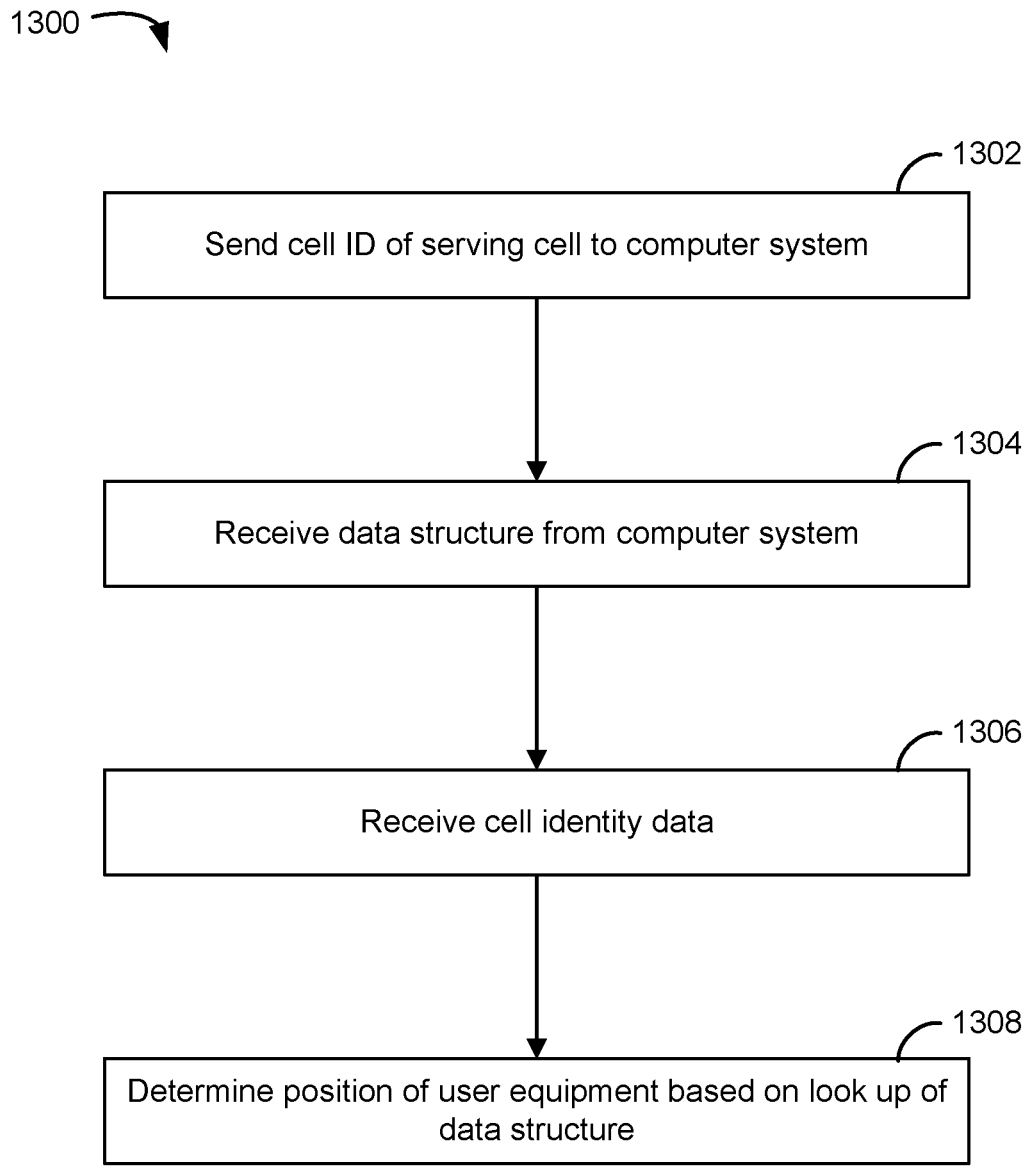
FIG. 13 illustrates another example of a flow for a UE-based positioning of a UE based on coverage sub-areas, in accordance with at least one embodiment.

FIG. 13 illustrates another example of a flow 1300 for a mobile device-based positioning of a mobile device based on coverage sub-areas, in accordance with at least one embodiment. As illustrated, the flow 1300 starts at operation 1302, where the mobile device sends, to the computer system, a cell identity of a serving cell on which the mobile device is camped. Although the mobile device may have detected one or more neighbor cells, the cell identities of such neighbor cells may not be reported to the computer system.

At operation 1304, the mobile device receives a data structure from the computer system. The data structure is associated with the serving cell, indicates its coverage area and coverage sub-areas, and indicates the most likely position within each of the coverage sub-areas (e.g., as a center, average position, or a weighted position). In an example, the computer system stores a single data structure for different coverage areas, such as a map (or a layer of a map). Rather than receiving the entire data structure, the computer system determines the portion of the data structure (e.g., the section of the map) indicating the coverage area of the serving cell and returns this portion to the mobile device, thereby necessitating a less amount of storage and processing at the mobile device. The mobile device stores the data structure (or portion thereof) in a memory of the mobile device.

At operation 1306, the mobile device receives cell identity data. In addition to the cell identity of the serving cell, the cell identity data includes one or more cell identities, as applicable, corresponding to neighbor cells and detected by the mobile device.

At operation 1308, the mobile device determines the position of the mobile device based on a look of the data structure. The look up is similar to the operation 1004 of the flow 1000 of FIG. 10 but is performed by the mobile device based on the data structure (or portion thereof) stored in the memory of the mobile device and uses the cell identity data generated at operation 1306.

Figure 14:
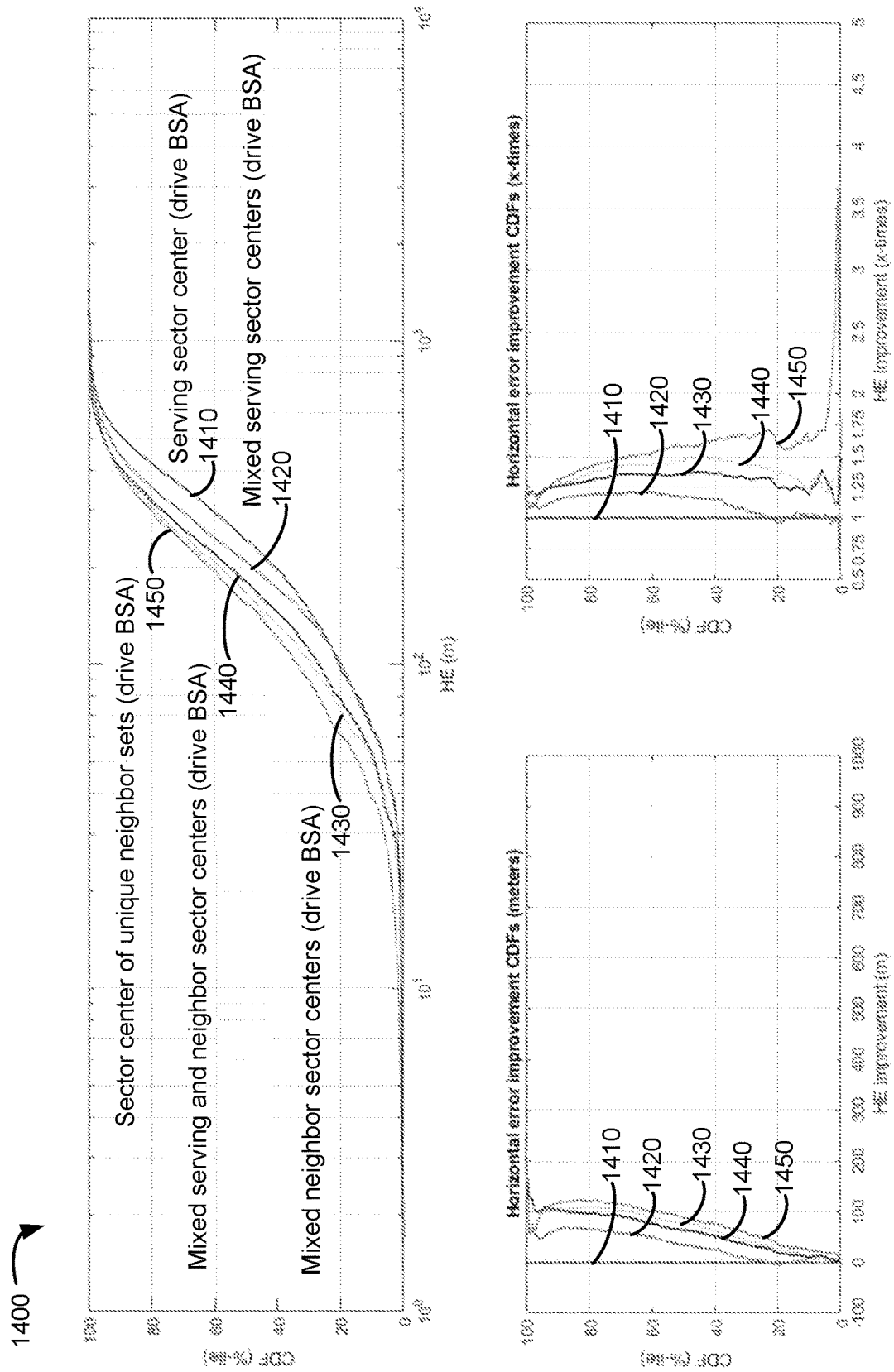
FIG. 14 illustrates testing results demonstrating improvements in the positioning of a UE based on coverage sub areas, in accordance with at least one embodiment.

FIG. 14 illustrates testing results 1400 demonstrating improvements in the positioning of a mobile device based on coverage sub areas, in accordance with at least one embodiment. As illustrated in this figure, horizontal error improvements are in the 1.25 to two times range over the serving sector technique described in FIG. 2. In particular, actual position measurements determined based on position sensors and position fixes determined based on the techniques described in connection with FIGS. 2-3 and 5-7 above were conducted and compared to derive the cumulative distribution functions (CDFs) of the horizontal error in meters and in x-times. The technique described in connection with FIG. 2 is labeled as "serving sector center (drive-BSA)." The technique described in connection with FIG. 3 is labeled as "mixed serving sector centers (drive-BSA)." The technique described in connection with FIG. 5 is labeled as "mixed neighbor sector centers (drive-BSA)." The technique described in connection with FIG. 6 is labeled as "mixed serving and neighbor sector centers (drive-BSA)." And the technique described in connection with FIG. 7A is labeled as "sector center of unique neighbor sets (drive-BSA)." As shown in the measurements plotted in FIG. 14, the technique described in connection with FIG. 7A outperforms the technique described in connection with FIG. 6 that, in turn, outperforms the technique described in connection with FIG. 5 that, in turn, outperforms the technique described in connection with FIG. 3 that, in turn, outperforms the technique described in connection with FIG. 2.

Figure 15:
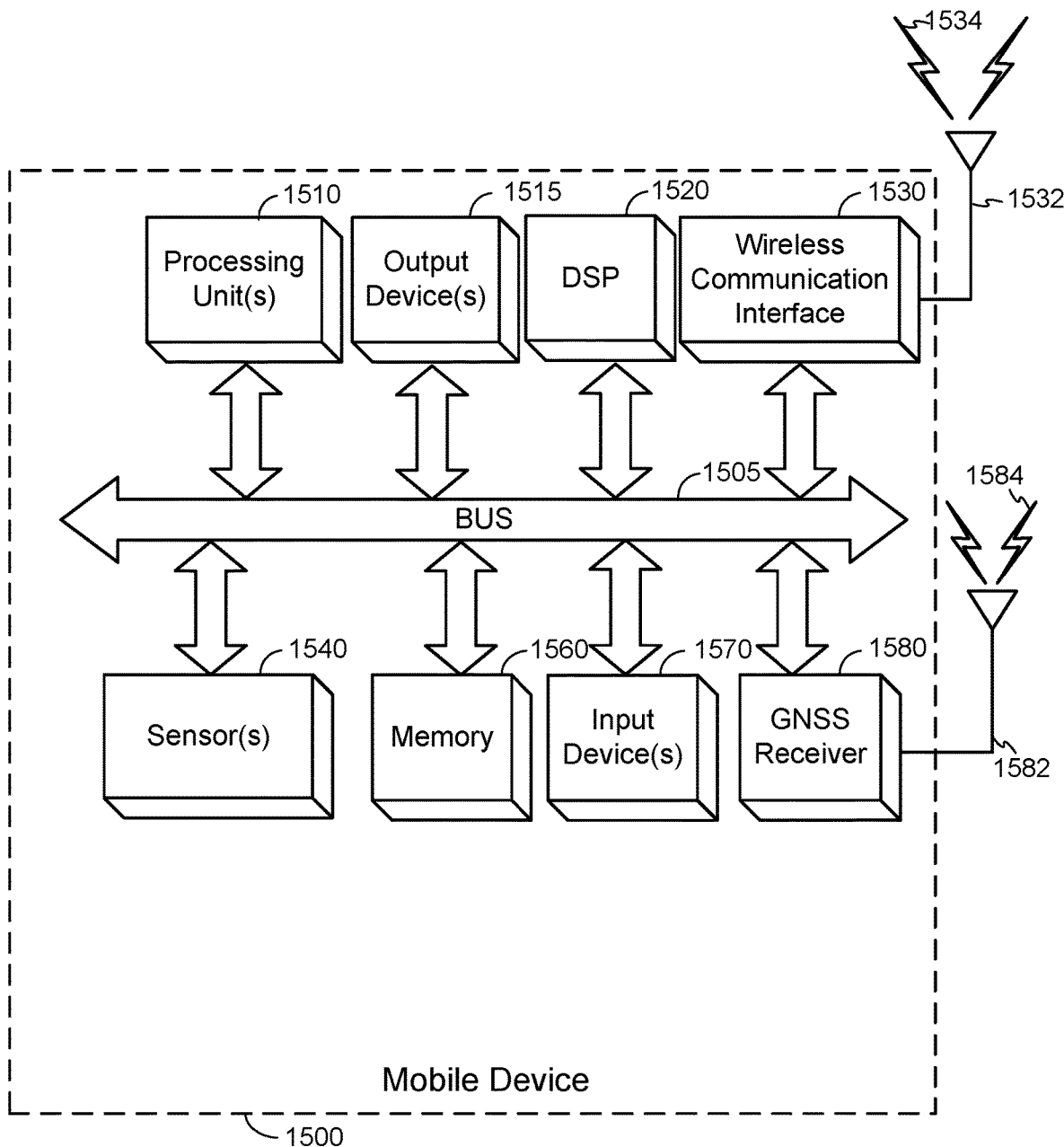
FIG. 15 is a block diagram of an embodiment of a mobile device, which can be utilized as a mobile device and/or UE, as described in the embodiments herein and in association with FIGS. 1-13.

FIG. 15 is a block diagram of an embodiment of a mobile device 1500, which can be utilized as a mobile device and/or UE as described in the embodiments herein and in association with FIGS. 1-13. It should be noted that FIG. 15 is meant only to provide a generalized illustration of various components of mobile device 1500, any or all of which may be utilized as appropriate. In other words, because mobile devices can vary widely in functionality, they may include only a portion of the components shown in FIG. 15. It can be noted that, in some instances, components illustrated by FIG. 15 can be localized to a single physical device and/or distributed among various networked devices, which may be disposed at different physical locations.

The mobile device 1500 is shown comprising hardware elements that can be electrically coupled via a bus 1505 (or may otherwise be in communication, as appropriate). The hardware elements may include a processing unit(s) 1510 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 15, some embodiments may have a separate DSP 1520, depending on desired functionality. The mobile device 1500 also may comprise one or more input devices 1570, which may comprise without limitation one or more touch screens, touch pads, microphones, buttons, dials, switches, and/or the like; and one or more output devices 1515, which may comprise without limitation, one or more displays, light emitting diodes (LEDs), speakers, and/or the like.

The mobile device 1500 might also include a wireless communication interface 1530, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, cellular communication facilities, etc.), and/or the like, which may enable the mobile device 1500 to communicate via the networks described herein with regard to FIGS. 1-13. The wireless communication interface 1530 may permit data to be communicated with a network, eNBs, ng-eNBs, gNBs, and/or other network components, computer systems, and/or any other electronic devices described herein. The communication can be carried out via one or more wireless communication antenna(s) 1532 that send and/or receive wireless signals 1534.

Depending on desired functionality, the wireless communication interface 1530 may comprise separate transceivers to communicate with base stations (e.g., eNBs, ng-eNBs and/or gNBs) and other terrestrial transceivers, such as wireless devices and access points. The mobile device 1500 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (WCDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, New Radio (NR) and so on. 5G, LTE, LTE Advanced, NR, GSM, and WCDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile device 1500 can further include sensor(s) 1540. Such sensors may comprise, without limitation, one or more inertial sensors (e.g., accelerometer(s), gyroscope(s), and or other Inertial Measurement Units (IMUs)), camera(s), magnetometer(s), compass, altimeter(s), microphone(s), proximity sensor(s), light sensor(s), barometer, and the like, some of which may be used to complement and/or facilitate the functionality described herein.

Embodiments of the mobile device 1500 may also include a GNSS receiver 1580 capable of receiving signals 1584 from one or more GNSS satellites (e.g., SVs 190) using an GNSS antenna 1582 (which may be combined in some implementations with antenna(s) 1532). Such positioning can be utilized to complement and/or incorporate the techniques described herein. The GNSS receiver 1580 can extract a position of the mobile device 1500, using conventional techniques, from GNSS SVs (e.g. SVs 190) of an GNSS system, such as Global Positioning System (GPS), Galileo, GLONASS, Compass, Quasi-Zenith Satellite System (QZSS) over Japan, Indian Regional Navigational Satellite System (IRNSS) over India, Beidou over China, and/or the like. Moreover, the GNSS receiver 1580 can use various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein a GNSS may include any combination of one or more global and/or regional navigation satellite systems and/or augmentation systems, and GNSS signals may include GNSS, GNSS-like, and/or other signals associated with such one or more GNSS.

The mobile device 1500 may further include and/or be in communication with a memory 1560. The memory 1560 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 1560 of the mobile device 1500 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the mobile device 1500 (e.g., using processing unit(s) 1510). In an aspect, then, such code and/or instructions can be used to configure and/or adapt a general purpose computer (or other device) to perform one or more operations in accordance with the described methods.

FIG. 16 illustrates an embodiment of a system 1600, which can be utilized as described herein above (e.g., in association with FIGS. 1-13). The components of the system 1600 are used to implement a base station. Additionally or alternatively, the components of a computer system, such as the computer system 140 of FIG. 1. For example, the system 1600 can perform one or more of the functions of the flows described herein above. It should be noted that FIG. 16 is meant only to provide a generalized illustration of various components, any or all of which may be utilized as appropriate. In some embodiments, the base station formed by the components of the system 1600 may correspond to a gNB, an ng-eNB, and/or an eNB as described herein above.

The system 1600 is shown comprising hardware elements that can be electrically coupled via a bus 1605 (or may otherwise be in communication, as appropriate). The hardware elements may include a processing unit(s) 1610 which can include without limitation one or more general-purpose processors, one or more special-purpose processors (such as DSP chips, graphics acceleration processors, ASICs, and/or the like), and/or other processing structure or means. As shown in FIG. 16, some embodiments may have a separate DSP 1620, depending on desired functionality. Location determination and/or other determinations based on wireless communication may be provided in the processing unit(s) 1610 and/or wireless communication interface 1630 (discussed below), according to some embodiments. The system 1600 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The system 1600 might also include a wireless communication interface 1630, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the system 1600 to communicate as described herein. The wireless communication interface 1630 may permit data and signaling to be communicated (e.g. transmitted and received) UEs, other base stations (e.g., eNBs, gNBs, and ng-eNBs), and/or other network components, computer systems, and/or any other electronic devices described herein. The communication can be carried out via one or more wireless communication antenna(s) 1632 that send and/or receive wireless signals 1634.

The system 1600 may also include a network interface 1680, which can include support of wireline communication technologies. The network interface 1680 may include a modem, network card, chipset, and/or the like. The network interface 1680 may include one or more input and/or output communication interfaces to permit data to be exchanged with a network, communication network servers, computer systems, and/or any other electronic devices described herein.

In many embodiments, the system 1600 will further comprise a memory 1660. The memory 1660 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1660 of the system 1600 also can comprise software elements (not shown in FIG. 16), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1660 that are executable by the system 1600 (and/or processing unit(s) 1610 or DSP 1620 within system 1600). In an aspect, then, such code and/or instructions can be used to configure and/or adapt a general purpose computer (or other device) to perform one or more operations in accordance with the described methods.

Figure 17:
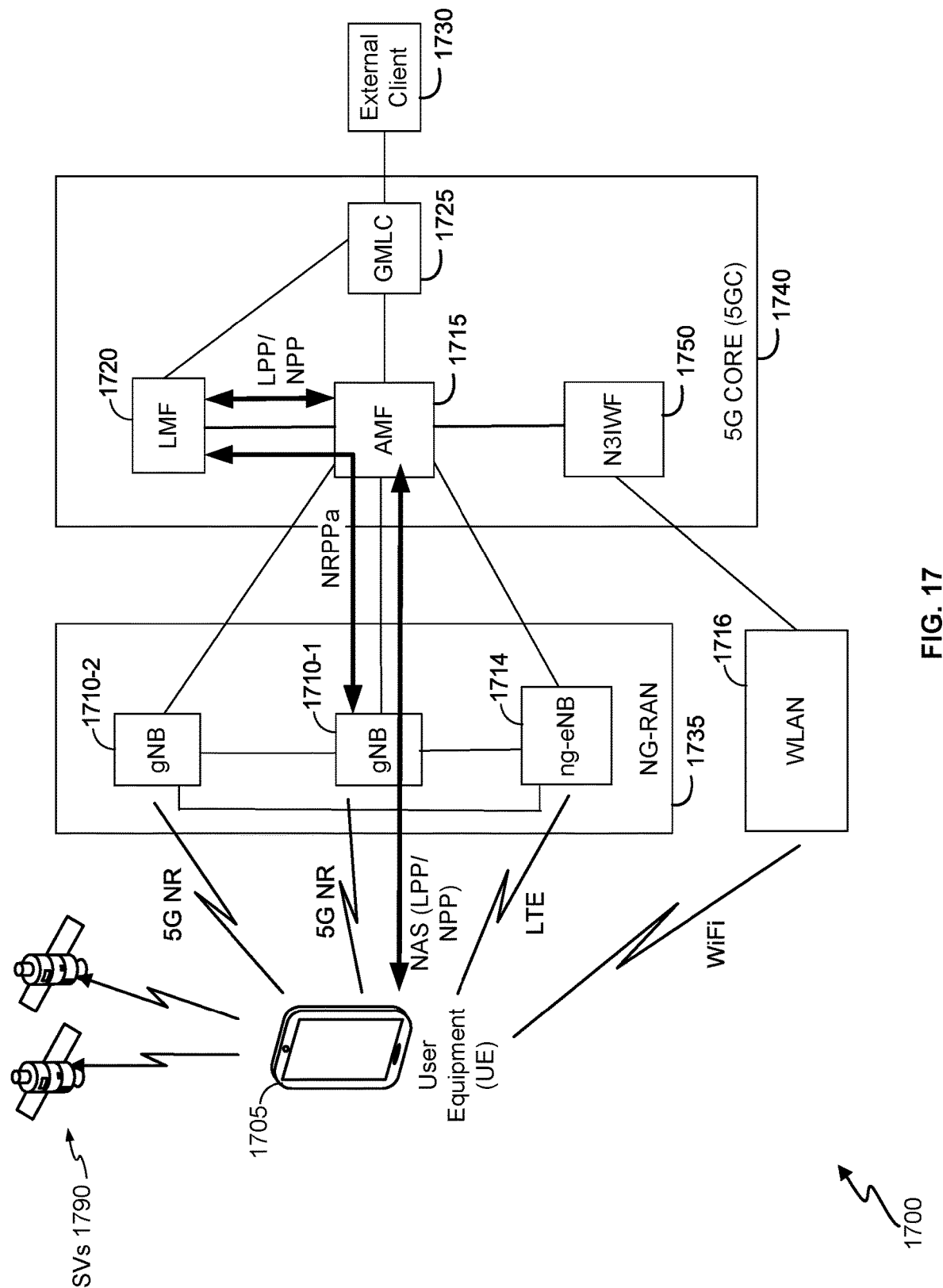
FIG. 17 shows a diagram of a communication system, in accordance with at least one embodiment.

FIG. 17 shows a diagram of a communication system 1700, in accordance with at least one embodiment. The communication system 1700 may be configured to determine the location of a UE 1705 by using access nodes 1710, 1714, 1716 and/or a location server (LMF 1720) to implement one or more positioning methods. Here, the communication system 1700 comprises a UE 1705, and components of a 5G network comprising a Next Generation (NG) Radio Access Network (RAN) (NG-RAN) 1735 and a 5G Core Network (5GC) 1740. A 5G network may also be referred to as an NR network; NG-RAN 1735 may be referred to as a 5G RAN or as an NR RAN; and 5GC 1740 may be referred to as an NG Core network (NGC). Standardization of an NG-RAN and 5GC is ongoing in the Third Generation Partnership Project (3GPP). Accordingly, NG-RAN 1735 and 5GC 1740 may conform to current or future standards for 5G support from 3GPP. The communication system 1700 may further utilize information from satellite vehicles (SVs) 1790 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 1700 are described below. The communication system 1700 may include additional or alternative components.

It should be noted that FIG. 17 provides only a generalized illustration of various components, any or all of which may be utilized as appropriate, and each of which may be duplicated or omitted as necessary. Specifically, although only one UE 1705 is illustrated, it will be understood that many UEs (e.g., hundreds, thousands, millions, etc.) may utilize the communication system 1700. Similarly, the communication system 1700 may include a larger (or smaller) number of SVs 1790, gNBs 1710, ng-eNBs 1714, WLANs 1716, AMFs 1715, external clients 1730, and/or other components. The illustrated connections that connect the various components in the communication system 1700 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 1705 may comprise and/or be referred to as a device, a mobile device, a wireless device, a mobile terminal, a terminal, a mobile station (MS), a SUPL-Enabled Terminal (SET), or by some other name. Moreover, UE 1705 may correspond to a cellphone, smartphone, laptop, tablet, PDA, tracking device, navigation device, Internet of Things (IoT) device, or some other portable or moveable device. Typically, though not necessarily, the UE 1705 may support wireless communication using one or more RATs such as using GSM, Code Division Multiple Access (CDMA), Wideband CDMA (WCDMA), LTE, High Rate Packet Data (HRPD), IEEE 802.11 Wi-Fi (also referred to as Wi-Fi), Bluetooth (BT), Worldwide Interoperability for Microwave Access (WiMAX), 5G New Radio (NR) (e.g., using the NG-RAN 1735 and 5GC 1740), etc. The UE 1705 may also support wireless communication using a WLAN which may connect to other networks (e.g. the Internet) using a Digital Subscriber Line (DSL) or packet cable for example. The use of one or more of these RATs may allow the UE 1705 to communicate with an external client 1730 (via elements of 5GC 1740 not shown in FIG. 17, or possibly via a Gateway Mobile Location Center (GMLC) 1725) and/or allow the external client 1730 to receive location information regarding the UE 1705 (e.g., via the GMLC 1725).

The UE 1705 may include a single entity or may include multiple entities such as in a personal area network where a user may employ audio, video and/or data I/O devices and/or body sensors and a separate wireline or wireless modem. An estimate of a location of the UE 1705 may be referred to as a location, location estimate, location fix, fix, position, position estimate or position fix, and may be geographic, thus providing location coordinates for the UE 1705 (e.g., latitude and longitude) which may or may not include an altitude component (e.g., height above sea level, height above or depth below ground level, floor level or basement level). Alternatively, a location of the UE 1705 may be expressed as a civic location (e.g., as a postal address or the designation of some point or small area in a building such as a particular room or floor). A location of the UE 1705 may also be expressed as an area or volume (defined either geographically or in civic form) within which the UE 1705 is expected to be located with some probability or confidence level (e.g., 67%, 95%, etc.) A location of the UE 1705 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

Base stations (BSs) in the NG-RAN 1735 shown in FIG. 17 comprise gNBs, 1710-1 and 1710-2 (collectively and generically referred to herein as gNBs 1710). Pairs of gNBs 1710 in NG-RAN 1735 may be connected to one another—e.g. directly as shown in FIG. 17 or indirectly via other gNBs 1710. Access to the 5G network is provided to UE 1705 via wireless communication between the UE 1705 and one or more of the gNBs 1710, which may provide wireless communications access to the 5GC 1740 on behalf of the UE 1705 using 5G NR. 5G NR radio access may also be referred to as NR radio access or as 5G radio access. In FIG. 17, the serving gNB for UE 1705 is assumed to be gNB 1710-1, although other gNBs (e.g. gNB 1710-2) may act as a serving gNB if UE 1705 moves to another location or may act as a secondary gNB to provide additional throughout and bandwidth to UE 1705.

Base stations (BSs) in the NG-RAN 1735 shown in FIG. 17 may also or instead include a next generation evolved Node B, also referred to as an ng-eNB, 1714. Ng-eNB 1714 may be connected to one or more gNBs 1710 in NG-RAN 1735—e.g. directly or indirectly via other gNBs 1710 and/or other ng-eNBs. An ng-eNB 1714 may provide LTE wireless access and/or evolved LTE (eLTE) wireless access to UE 1705. Some gNBs 1710 (e.g. gNB 1710-2) and/or ng-eNB 1714 in FIG. 17 may be configured to function as positioning-only beacons which may transmit signals (e.g. PRS signals) and/or may broadcast assistance data to assist positioning of UE 1705 but may not receive signals from UE 1705 or from other UEs. It is noted that while only one ng-eNB 1714 is shown in FIG. 17, some embodiments may include multiple ng-eNBs 1714.

Communication system 1700 may also include one or more WLANs 1716 which may connect to a Non-3GPP InterWorking Function (N3IWF) 1750 in the 5GC 1740. For example, the WLAN 1716 may support IEEE 802.11 Wi-Fi access for UE 1705 and may comprise one or more Wi-Fi APs. Here, the N3IWF 1750 may connect to other elements in the 5GC 1740 such as AMF 1715. In some embodiments, WLAN 1716 may support another RAT such as Bluetooth. The N3IWF 1750 may provide support for secure access by UE 1705 to other elements in 5GC 1740 and/or may support interworking of one or more protocols used by WLAN 1716 and UE 1705 to one or more protocols used by other elements of 5GC 1740 such as AMF 1715. For example, N3IWF 1750 may support IPsec tunnel establishment with UE 1705, termination of IKEv2/IPsec protocols with UE 1705, termination of N2 and N3 interfaces to 5GC 1740 for control plane and user plane, respectively, relaying of uplink and downlink control plane NAS (N1) signaling between UE 1705 and AMF 1715. In some other embodiments, WLAN 1716 may connect directly to elements in 5GC 1740 (e.g. AMF 1715) and not via N3IWF 1750—e.g. if WLAN 1716 is a trusted WLAN for 5GC 1740. It is noted that while only one WLAN 1716 is shown in FIG. 17, some embodiments may include multiple WLANs 1716.

As referred to herein, access nodes may comprise any of a variety of network entities enabling communication between the UE 1705 and the AMF 1715. This can include gNBs 1710, ng-eNB 1714, WLAN 1716 and/or other types of cellular base stations. However, access nodes providing the functionality described herein may additionally or alternatively include entities enabling communications to any of a variety of RATs not illustrated in FIG. 17, which may include non-cellular technologies. Thus, the term "access node," as used in the embodiments described herein below, may include but is not necessarily limited to a gNB 1710, ng-eNB 1714 or WLAN 1716.

As will be discussed in greater detail below, in some embodiments, the gNBs 1710, ng-eNB 1714 and/or WLAN 1716 (alone or in combination with other modules/units of the communication system 1700) may be configured to, in response to receiving a request for location information for multiple RATs from the LMF 1720, take measurements for one of the multiple RATs (e.g., measurement of the UE 1705) and/or obtain measurements from the UE 1705 that are conducted using one or more of the multiple RATs. As noted, while FIG. 17 depicts access nodes 1710, 1714, 1716 configured to communicate according to 5G NR, LTE and Wi-Fi communication protocols, nodes configured to communicate according to other communication protocols may be used, such as, for example, an LTE protocol for an UMTS Terrestrial Radio Access Network (E-UTRAN) or a Bluetooth protocol for a WLAN. For example, in a 4G Evolved Packet System (EPS) providing LTE wireless access to UE 1705, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 1735 and the EPC corresponds to 5GC 1740 in FIG. 17. The methods and techniques described herein for UE 1705 positioning using common or generic positioning procedures may be applicable to such other networks.

The gNBs 1710 and ng-eNB 1714 can communicate with an AMF 1715, which, for positioning functionality, communicates with an LMF 1720. The AMF 1715 may support mobility of the UE 1705, including cell change and handover, including handover to from an access node 1710, 1714 or 1716 of a first RAT to an access node 1710, 1714 or 1716 of a second RAT. The AMF 1715 may also participate in supporting a signaling connection to the UE 1705 and possibly data and voice bearers for the UE 1705. The LMF 1720 may support positioning of the UE 1705 when UE accesses the NG-RAN 1735 or WLAN 1716 and may support position procedures/methods, including UE assisted/UE based and/or network based procedures/methods, such as Assisted GNSS (A-GNSS), OTDOA, Real Time Kinematics (RTK), Precise Point Positioning (PPP), Differential GNSS (DGNSS), ECID, OTDOA, angle of arrival (AOA), angle of departure (AOD), WLAN positioning, and/or other positioning procedures. The LMF 1720 may also process location services requests for the UE 1705, e.g., received from the AMF 1715 or from the GMLC 1725. The LMF 1720 may be connected to AMF 1715 and/or to GMLC 1725. The LMF 1720 may be referred to by other names such as a Location Manager (LM), Location Function (LF), commercial LMF (CLMF) or value added LMF (VLMF). In some embodiments, a node/system that implements the LMF 1720 may additionally or alternatively implement other types of location-support modules, such as an E-SMLC. It is noted that in some embodiments, at least part of the positioning functionality (including determination of a UE 1705's location) may be performed at the UE 1705 (e.g., using signal measurements obtained by UE 1705 for signals transmitted by wireless nodes such as gNBs 1710, ng-eNB 1714 and/or WLAN 1716, and assistance data provided to the UE 1705, e.g. by LMF 1720).

The Gateway Mobile Location Center (GMLC) 1725 may support a location request for the UE 1705 received from an external client 1730 and may forward such a location request to the AMF 1715 for forwarding by the AMF 1715 to the LMF 1720 or may forward the location request directly to the LMF 1720. A location response from the LMF 1720 (e.g. containing a location estimate for the UE 1705) may be similarly returned to the GMLC 1725 either directly or via the AMF 1715, and the GMLC 1725 may then return the location response (e.g., containing the location estimate) to the external client 1730. The GMLC 1725 is shown connected to both the AMF 1715 and LMF 1720 in FIG. 17 though only one of these connections may be supported by 5GC 1740 in some implementations.

As further illustrated in FIG. 17, the LMF 1720 may communicate with the gNBs 1710 and/or with the ng-eNB 1714 using a NRPPa (which also may be referred to as NPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between a gNB 1710 and the LMF 1720, and/or between an ng-eNB 1714 and the LMF 1720, via the AMF 1715. As further illustrated in FIG. 17, LMF 1720 and UE 1705 may communicate using an LPP protocol, which may be defined in 3GPP TS 36.355. LMF 1720 and UE 1705 may also or instead communicate using an NPP protocol, which may be the same as, similar to, or an extension of LPP. Here, LPP and/or NPP messages may be transferred between the UE 1705 and the LMF 1720 via the AMF 1715 and a serving gNB 1710-1 or serving ng-eNB 1714 for UE 1705. For example, LPP and/or NPP messages may be transferred between the LMF 1720 and the AMF 1715 using a 5G Location Services Application Protocol (LCS AP) and may be transferred between the AMF 1715 and the UE 1705 using a 5G Non-Access Stratum (NAS) protocol. The LPP and/or NPP protocol may be used to support positioning of UE 1705 using UE assisted and/or UE based position methods such as A-GNSS, RTK, OTDOA and/or ECID. The NRPPa protocol may be used to support positioning of UE 1705 using network based position methods such as ECID (e.g. when used with measurements obtained by a gNB 1710 or ng-eNB 1714) and/or may be used by LMF 1720 to obtain location related information from gNBs 1710 and/or ng-eNB 1714, such as parameters defining PRS transmission from gNBs 1710 and/or ng-eNB 1714.

In the case of UE 1705 access to WLAN 1716, LMF 1720 may use NRPPa and/or LPP/NPP to obtain a location of UE 1705 in a similar manner to that just described for UE 1705 access to a gNB 1710 or ng-eNB 1714. Thus, NRPPa messages may be transferred between a WLAN 1716 and the LMF 1720, via the AMF 1715 and N3IWF 1750 to support network based positioning of UE 1705 and/or transfer of other location information from WLAN 1716 to LMF 1720. Similarly, LPP and/or NPP messages may be transferred between the UE 1705 and the LMF 1720 via the AMF 1715, N3IWF 1750 and serving WLAN 1716 for UE 1705 to support UE assisted or UE based positioning of UE 1705 by LMF 1720.

With a UE assisted position method, UE 1705 may obtain location measurements and send the measurements to a location server (e.g. LMF 1720) for computation of a location estimate for UE 1705. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for gNBs 1710, ng-eNB 1714 and/or an access point (AP) for WLAN 1716. The location measurements may also or instead include measurements of GNSS pseudorange, code phase and/or carrier phase for SVs 1790. With a UE based position method, UE 1705 may obtain location measurements (e.g. which may be the same as or similar to location measurements for a UE assisted position method) and may compute a location of UE 1705 (e.g. with the help of assistance data received from a location server such as LMF 1720 or broadcast by gNBs 1710, ng-eNB 1714 or WLAN 1716). With a network based position method, one or more base stations (e.g. gNBs 1710 and/or ng-eNB 1714) or APs (e.g. in WLAN 1716) may obtain location measurements (e.g. measurements of RSSI, RTT, RSRP, RSRQ, AOA or Time Of Arrival (TOA)) for signals transmitted by UE 1705, and/or may receive measurements obtained by UE 1705, and may send the measurements to a location server (e.g. LMF 1720) for computation of a location estimate for UE 1705.

Information provided by the gNBs 1710 and/or ng-eNB 1714 to the LMF 1720 using NRPPa may include timing and configuration information for PRS transmission and location coordinates. The LMF 1720 can then provide some or all of this information to the UE 1705 as assistance data in an LPP and/or NPP message via the NG-RAN 1735 and the 5GC 1740.

An LPP or NPP message sent from the LMF 1720 to the UE 1705 may instruct the UE 1705 to do any of a variety of things, depending on desired functionality. For example, the LPP or NPP message could contain an instruction for the UE 1705 to obtain measurements for GNSS (or A-GNSS), WLAN, and/or OTDOA (or some other position method). In the case of OTDOA, the LPP or NPP message may instruct the UE 1705 to obtain one or more measurements (e.g. RSTD measurements) of PRS signals transmitted within particular cells supported by particular gNBs 1710 and/or ng-eNB 1714 (or supported by some other type of base station such as an eNB or Wi-Fi AP). An RSTD measurement may comprise the difference in the times of arrival at the UE 1705 of a signal (e.g. a PRS signal) transmitted or broadcast by one gNB 1710 and a similar signal transmitted by another gNB 1710. The UE 1705 may send the measurements back to the LMF 1720 in an LPP or NPP message (e.g. inside a 5G NAS message) via the serving gNB 1710-1 17 (or serving ng-eNB 1714) and the AMF 1715.

As noted, while the communication system 1700 is described in relation to 5G technology, the communication system 1700 may be implemented to support other communication technologies, such as GSM, WCDMA, LTE, etc., that are used for supporting and interacting with mobile devices such as the UE 1705 (e.g., to implement voice, data, positioning, and other functionalities). In some such embodiments, the 5GC 1740 may be configured to control different air interfaces. For example, in some embodiments, both the NG-RAN 1735 and the 5GC 1740 may be replaced by other RANs and other core networks. For example, in an EPS, the NG-RAN 1735 may be replaced by an E-UTRAN containing eNBs and the 5GC 1740 may be replaced by an EPC containing a Mobility Management Entity (MME) in place of the AMF 1715, an E-SMLC in place of the LMF 1720 and a GMLC that may be similar to the GMLC 1725. In such an EPS, the E-SMLC may use LPPa in place of NRPPa to send and receive location information to and from the eNBs in the E-UTRAN and may use LPP to support positioning of UE 1705. In these other embodiments, on-demand resource allocation for positioning of a UE 1705 may be supported in an analogous manner to that described herein for a 5G network with the difference that functions and procedures described herein for gNBs 1710, ng-eNB 1714, AMF 1715 and LMF 1720 may, in some cases, apply instead to other network elements such eNBs, Wi-Fi APs, an MME and an E-SMLC.

To support certain position methods such as OTDOA and transmission or PRS or other signals used in positioning of a UE 1705, base stations may be synchronized. In a synchronized network, the transmission timing of gNBs 1710 may be synchronized such that each gNB 1710 has the same transmission timing as every other gNB 1710 to a high level of precision—e.g. 50 nanoseconds or less. Alternatively, the gNBs 1710 may be synchronized at a radio frame or subframe level such that each gNB 1710 transmits a radio frame or subframe during the same time duration as every other gNB 1710 (e.g. such that each gNB 1710 starts and finishes transmitting a radio frame or subframe at almost precisely the same times as every other gNB 1710), but does not necessarily maintain the same counters or numbering for radio frames or subframes. For example, when one gNB 1710 is transmitting a subframe or radio frame with counter or number zero (which may be the first radio frame or subframe in some periodically repeated sequence of radio frames or subframes), another gNB 1710 may be transmitting a radio frame or subframe with a different number or counter such as one, ten, one hundred etc.

Synchronization of the transmission timing of ng-eNBs 1714 in NG-RAN 1735 may be supported in a similar manner to synchronization of gNBs 1710, although since ng-eNBs 1714 may typically use a different frequency to gNBs 1710 (to avoid interference), an ng-eNB 1714 may not always be synchronized to gNBs 1710. Synchronization of gNBs 1710 and ng-eNBs 1714 may be achieved using a GPS receiver or a GNSS receiver in each gNB 1710 and ng-eNB 1714 or by other means such as using the IEEE 1588 Precision Time Protocol.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing devices accessing stored software that programs or configures the portable device from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

In view of this description embodiments may include different combinations of features. Implementation examples are described in the following numbered clauses:

Clause 1: A method for positioning a mobile device within a coverage area of a serving cell in communication with the mobile device, the method implemented by the mobile device and comprising: receiving cell identity data, the cell identity data comprising one or more cell identities; and determining a coverage sub-area of the coverage area of the serving cell based on using the cell identity data in a look up of a data structure, the data structure associating coverage sub-areas of the coverage area with cell identities, each one of the coverage sub-areas being associated in the data structure with a cell identity of the serving cell, and at least one of the coverage sub-areas being further associated in the data structure with a cell identity of a neighbor cell; and determining a position of the mobile device, the position being within the coverage sub-area of the coverage area of the serving cell.

Clause 2: The method of clause 1, further comprising: sending, to a computer system, the cell identity data, wherein the computer system stores the data structure, and wherein determining the position of the mobile device comprises receiving the position from the computer system.

Clause 3: The method of any of clauses 1-2 further comprising storing, in a memory of the mobile device, the data structure; and performing the look up of the data structure from the memory.

Clause 4: The method of clause 1 further comprising sending, to a computer system, the cell identity of the serving cell, wherein the computer system stores, for each cell of a plurality of cells, a corresponding data structure that divides a coverage area of the respective cell into coverage sub-areas; and receiving, from the computer system and based on the cell identity of the serving cell, the data structure corresponding to the serving cell.

Clause 5: The method of any of clauses 1-4 further comprising prior to receiving the cell identity data: determining, by a position sensor of the mobile device, position data indicating a second position of the mobile device within the coverage area of the serving cell; receiving second cell identity data that comprises the cell identity of the serving cell and the cell identity of the neighbor cell; and sending, to a computer system, the position data and the second cell identity data, wherein the data structure is generated by the computer system based on the position data and the second cell identity data.

Clause 6: The method of any of clauses 1-5, wherein the data structure represents a map that (i) divides the coverage area of the serving cell into the coverage sub-areas, (ii) maps each one of the coverage sub-areas to a set of cell identities, and (iii) indicates the position of the mobile device as a likely position within each one of the coverage sub-areas, wherein the likely position for each one of the coverage sub-areas is determined based on position data collected from a plurality of mobile devices while being in the respective coverage sub-area.

Clause 7: The method of any of clauses 1-6, wherein the map is associated with at least one of: a mobile network operator, a frequency channel, or a radio access technology.

Clause 8: The method of clause 7, wherein the coverage sub-area associated with the cell identity of the neighbor cell is further associated with a likely position, wherein the cell identity data comprises the cell identity of the neighbor cell, and wherein the position is the likely position.

Clause 9: The method of any of clauses 1-8, wherein the data structure further associates coverage sub-areas of the coverage area with a beam index of the serving cell, a beam index of the neighbor cell, or both.

Clause 10: The method of any of clauses 1-9, wherein the coverage area is associated with a first likely position, wherein the coverage sub-area associated with the cell identity of the neighbor cell is further associated with a second likely position, wherein the cell identity data comprises the cell identity of the neighbor cell, and wherein the position is within the coverage sub-area associated with the cell identity of the neighbor cell and comprises a likely position determined based on the first likely position and the second likely position.

Clause 11: The method of any of clauses 1-10, wherein the coverage sub-areas of the serving cell comprise a number of unique non-overlapping coverage sub-areas, wherein the data structure associates each of the unique non-overlapping coverage sub-areas with the serving cell and with a unique set of neighbor cells.

Clause 12: The method of clause 11, wherein the unique non-overlapping coverage sub-areas comprise a first coverage sub-area associated with the serving cell and the neighbor cell and a second coverage sub-area associated with the serving cell and no neighbor cell.

Clause 13: The method of clause 11, wherein a second coverage sub-area is defined based on first data of a first plurality of mobile devices, wherein a third coverage sub-area is defined based on second data of a second plurality of mobile devices, wherein the first data comprises first mobile device positions and the cell identity of the neighbor cell, wherein the first data excludes a cell identity of an other neighbor cell, and wherein the second data comprises second mobile device positions, the cell identity of the neighbor cell, and the cell identity of the other neighbor cell.

Clause 14: The method of any of clauses 1 or 8-11, wherein the data structure represents a map that (i) divides the coverage area of the serving cell into the coverage sub-areas and (ii) constrains a boundary of each one of the coverage sub-areas to be within a boundary of the coverage area.

Clause 15: The method of any of clauses 1 or 8-11, wherein the data structure represents a map that (i) divides the coverage area of the serving cell into the coverage sub-areas and (ii) constrains a likely mobile device position within each one of the coverage sub-area to be within the coverage area.

Clause 16: The method of any of clauses 1 or 8-11, wherein the data structure represents a map that divides the coverage area of the serving cell into the coverage sub-areas, and wherein the coverage sub-areas are non-overlapping.

Clause 17: The method of any of clauses 1-16, wherein the neighbor cell comprises: a different cell than the serving cell and is on a same frequency channel as the serving cell, a cell on a different frequency channel than the serving cell, a cell on a different radio access technology (RAT) with the same frequency channel as the serving cell, or a cell on a different RAT with a different frequency channel than the serving cell.

Clause 18: A method for determining cell coverage from crowdsourced information received at a cellular entity of a data communication network, the method comprising: obtaining, at the cellular entity, cell identity data and position data for a plurality of positions within a coverage area of a serving cell, wherein the cellular entity comprises a mobile device or computer system, and wherein, for each position: the position data includes the respective position, and the cell identity data includes one or more cell identities detected at the respective position of one or more mobile devices; storing, with the cellular entity, the position data and the cell identity data; and associating, by the cellular entity using a data structure, coverage sub-areas of the coverage area with cell identities, based on the cell identity data and position data, wherein: each one of the coverage sub-areas is associated in the data structure with a cell identity of the serving cell, and at least one of the coverage sub-areas being further associated in the data structure with a cell identity of a neighbor cell.

Clause 19: The method of clause 18, further comprising storing, for each cell of a plurality of cells, a corresponding data structure that divides a coverage area of the respective cell into coverage sub-areas.

Clause 20: The method of any of clauses 18-19 wherein, for at least one position of the plurality of positions, the cell identity data includes a cell identity of the serving cell and a cell identity of at least one the neighbor cell.

Clause 21: The method of any of clauses 18-20, wherein the data structure represents a map that (i) divides the coverage area of the serving cell into the coverage sub-areas, (ii) maps each coverage sub-area to a set of cell identities, and (iii) indicates the position of a target mobile device as a likely position within the coverage sub-area, wherein the likely position is determined based on position data collected from the one or more mobile devices while being in the coverage sub-area.

Clause 22: The method of clause 21, wherein the map is associated with at least one of: a mobile network operator, a frequency channel, or a radio access technology.

Clause 23: The method of any of clauses 18-22, wherein the coverage sub-area associated with the cell identity of the neighbor cell is further associated with a likely position, wherein the cell identity data comprises the cell identity of the neighbor cell, and wherein the position is the likely position.

Clause 24: The method of any of clauses 18-22, wherein the coverage area is associated with a first likely position, wherein the coverage sub-area associated with the cell identity of the neighbor cell is further associated with a second likely position, wherein the cell identity data comprises the cell identity of the neighbor cell, and wherein the position is within the coverage sub-area associated with the cell identity of the neighbor cell and comprises a likely position determined based on the first likely position and the second likely position.

Clause 25: The method of any of clauses 18-22, wherein the coverage sub-areas of the serving cell comprise a number of unique non-overlapping coverage sub-areas, wherein the data structure associates each of the unique non-overlapping coverage sub-areas with the serving cell and with a unique set of neighbor cells.

Clause 26: The method of any of clauses 18-25, wherein the data structure represents a map that (i) divides the coverage area of the serving cell into the coverage sub-areas and (ii) constrains a boundary of each coverage sub-area to be within a boundary of the coverage area.

Clause 27: The method of any of clauses 18-25, wherein the data structure represents a map that (i) divides the coverage area of the serving cell into the coverage sub-areas and (ii) constrains a likely mobile device position within each coverage sub-area to be within the coverage area.

Clause 28: The method of any of clauses 18-27, wherein the neighbor cell comprises: a different cell than the serving cell and is on a same frequency channel as the serving cell, a cell on a different frequency channel than the serving cell, a cell on a different radio access technology (RAT) with the same frequency channel as the serving cell, or a cell on a different RAT with a different frequency channel than the serving cell.

Clause 29: The method of clause 28, wherein the data structure further associates coverage sub-areas of the coverage area with a beam index of the serving cell, a beam index of the neighbor cell, or both.

Clause 30: A mobile device for positioning the mobile device within a coverage area of a serving cell in communication with the mobile device, the mobile device comprising: a transceiver; a memory; and one or more processing units communicatively coupled with the transceiver and the memory, wherein the one or more processing units are configured to: receive cell identity data via the transceiver, the cell identity data comprising one or more cell identities; and determine a coverage sub-area of the coverage area of the serving cell based on using the cell identity data in a look up of a data structure, the data structure associating coverage sub-areas of the coverage area with cell identities, each one of the coverage sub-areas being associated in the data structure with a cell identity of the serving cell, and at least one of the coverage sub-areas being further associated in the data structure with a cell identity of a neighbor cell; and determine a position of the mobile device, the position being within the coverage sub-area of the coverage area of the serving cell.

Clause 31: The mobile device of clause 30, wherein the one or more processing units are further configured to: send, to a computer system, the cell identity data, wherein the computer system stores the data structure, and wherein determining the position of the mobile device comprises receiving the position from the computer system.

Clause 32: The mobile device of any of clauses 30-31, wherein the one or more processing units are further configured to: store, in the memory, the data structure; and perform the look up of the data structure from the memory.

Clause 33: The mobile device of clause 30, wherein the one or more processing units are further configured to: send, to a computer system, the cell identity of the serving cell, wherein the computer system stores, for each cell of a plurality of cells, a corresponding data structure that divides a coverage area of the respective cell into coverage sub-areas; and receive, from the computer system and based on the cell identity of the serving cell, the data structure corresponding to the serving cell.

Clause 34: The mobile device of any of clauses 30-33, wherein the one or more processing units are further configured to: prior to receiving the cell identity data: determine position data indicating a second position of the mobile device within the coverage area of the serving cell; receive second cell identity data that comprises the cell identity of the serving cell and the cell identity of the neighbor cell; and send, to a computer system, the position data and the second cell identity data, wherein the data structure is generated by the computer system based on the position data and the second cell identity data.

Clause 35: The mobile device of any of clauses 30-34, wherein the data structure represents a map that (i) divides the coverage area of the serving cell into the coverage sub-areas, (ii) maps each one of the coverage sub-areas to a set of cell identities, and (iii) indicates the position of the mobile device as a likely position within each one of the coverage sub-areas, wherein the likely position for each one of the coverage sub-areas is determined based on position data collected from a plurality of mobile devices while being in the respective coverage sub-area.

Clause 36: The mobile device of any of clauses 30-35, wherein the map is associated with at least one of: a mobile network operator, a frequency channel, or a radio access technology.

Clause 37: The mobile device of clause 36, wherein the coverage sub-area associated with the cell identity of the neighbor cell is further associated with a likely position, wherein the cell identity data comprises the cell identity of the neighbor cell, and wherein the position is the likely position.

Clause 38: The mobile device of any of clauses 30-37, wherein the data structure further associates coverage sub-areas of the coverage area with a beam index of the serving cell, a beam index of the neighbor cell, or both.

Clause 39: The mobile device of any of clauses 30-38, wherein the coverage area is associated with a first likely position, wherein the coverage sub-area associated with the cell identity of the neighbor cell is further associated with a second likely position, wherein the cell identity data comprises the cell identity of the neighbor cell, and wherein the position is within the coverage sub-area associated with the cell identity of the neighbor cell and comprises a likely position determined based on the first likely position and the second likely position.

Clause 40: The mobile device of any of clauses 30-39, wherein the coverage sub-areas of the serving cell comprise a number of unique non-overlapping coverage sub-areas, wherein the data structure associates each of the unique non-overlapping coverage sub-areas with the serving cell and with a unique set of neighbor cells.

Clause 41: The mobile device of clause 40, wherein the unique non-overlapping coverage sub-areas comprise a first coverage sub-area associated with the serving cell and the neighbor cell and a second coverage sub-area associated with the serving cell and no neighbor cell.

Clause 42: The mobile device of clause 40, wherein a second coverage sub-area is defined based on first data of a first plurality of mobile devices, wherein a third coverage sub-area is defined based on second data of a second plurality of mobile devices, wherein the first data comprises first mobile device positions and the cell identity of the neighbor cell, wherein the first data excludes a cell identity of an other neighbor cell, and wherein the second data comprises second mobile device positions, the cell identity of the neighbor cell, and the cell identity of the other neighbor cell.

Clause 43: The mobile device of any of clauses 30 or 37-40, wherein the data structure represents a map that (i) divides the coverage area of the serving cell into the coverage sub-areas and (ii) constrains a boundary of each one of the coverage sub-areas to be within a boundary of the coverage area.

Clause 44: The mobile device of any of clauses 30 or 37-40, wherein the data structure represents a map that (i) divides the coverage area of the serving cell into the coverage sub-areas and (ii) constrains a likely mobile device position within each one of the coverage sub-area to be within the coverage area.

Clause 45: The mobile device of any of clauses 30 or 37-40, wherein the data structure represents a map that divides the coverage area of the serving cell into the coverage sub-areas, and wherein the coverage sub-areas are non-overlapping.

Clause 46: The mobile device of any of clauses 30-45, wherein the neighbor cell comprises: a different cell than the serving cell and is on a same frequency channel as the serving cell, a cell on a different frequency channel than the serving cell, a cell on a different radio access technology (RAT) with the same frequency channel as the serving cell, or a cell on a different RAT with a different frequency channel than the serving cell.

Clause 47: A cellular entity of a data communication network for determining cell coverage from crowdsourced information received at the cellular entity, the cellular entity comprising: a transceiver; a memory; and one or more processing units communicatively coupled with the transceiver and the memory, wherein the one or more processing units are configured to: obtain, at the cellular entity, cell identity data and position data for a plurality of positions within a coverage area of a serving cell, wherein the cellular entity comprises a mobile device or computer system, and wherein, for each position: the position data includes the respective position, and the cell identity data includes one or more cell identities detected at the respective position of one or more mobile devices; store, with the cellular entity, the position data and the cell identity data; and associate coverage sub-areas of the coverage area with cell identities, based on the cell identity data and position data, wherein: each one of the coverage sub-areas is associated in the data structure with a cell identity of the serving cell, and at least one of the coverage sub-areas being further associated in the data structure with a cell identity of a neighbor cell.

Clause 48: The cellular entity of clause 47, wherein the one or more processing units are further configured to store, for each cell of a plurality of cells, a corresponding data structure that divides a coverage area of the respective cell into coverage sub-areas.

Clause 49: The cellular entity of any of clauses 47-48 wherein, for at least one position of the plurality of positions, the cell identity data includes a cell identity of the serving cell and a cell identity of at least one the neighbor cell.

Clause 50: The cellular entity of any of clauses 47-49, wherein the data structure represents a map that (i) divides the coverage area of the serving cell into the coverage sub-areas, (ii) maps each coverage sub-area to a set of cell identities, and (iii) indicates the position of a target mobile device as a likely position within the coverage sub-area, wherein the likely position is determined based on position data collected from the one or more mobile devices while being in the coverage sub-area.

Clause 51: The cellular entity of clause 50, wherein the map is associated with at least one of: a mobile network operator, a frequency channel, or a radio access technology.

Clause 52: The cellular entity of any of clauses 47-51, wherein the coverage sub-area associated with the cell identity of the neighbor cell is further associated with a likely position, wherein the cell identity data comprises the cell identity of the neighbor cell, and wherein the position is the likely position.

Clause 53: The cellular entity of any of clauses 47-51, wherein the coverage area is associated with a first likely position, wherein the coverage sub-area associated with the cell identity of the neighbor cell is further associated with a second likely position, wherein the cell identity data comprises the cell identity of the neighbor cell, and wherein the position is within the coverage sub-area associated with the cell identity of the neighbor cell and comprises a likely position determined based on the first likely position and the second likely position.

Clause 54: The cellular entity of any of clauses 47-51, wherein the coverage sub-areas of the serving cell comprise a number of unique non-overlapping coverage sub-areas, wherein the data structure associates each of the unique non-overlapping coverage sub-areas with the serving cell and with a unique set of neighbor cells.

Clause 55: The cellular entity of any of clauses 47-54, wherein the data structure represents a map that (i) divides the coverage area of the serving cell into the coverage sub-areas and (ii) constrains a boundary of each coverage sub-area to be within a boundary of the coverage area.

Clause 56: The cellular entity of any of clauses 47-54, wherein the data structure represents a map that (i) divides the coverage area of the serving cell into the coverage sub-areas and (ii) constrains a likely mobile device position within each coverage sub-area to be within the coverage area.

Clause 57: The cellular entity of any of clauses 47-56, wherein the neighbor cell comprises: a different cell than the serving cell and is on a same frequency channel as the serving cell, a cell on a different frequency channel than the serving cell, a cell on a different radio access technology (RAT) with the same frequency channel as the serving cell, or a cell on a different RAT with a different frequency channel than the serving cell.

Clause 58: The cellular entity of any of clauses 47-57, wherein the data structure further associates coverage sub-areas of the coverage area with a beam index of the serving cell, a beam index of the neighbor cell, or both.

Clause 59: An apparatus for positioning a mobile device within a coverage area of a serving cell in communication with the mobile device, the apparatus comprising: means for receiving cell identity data, the cell identity data comprising one or more cell identities; and means for determining a coverage sub-area of the coverage area of the serving cell based on using the cell identity data in a look up of a data structure, the data structure associating coverage sub-areas of the coverage area with cell identities, each one of the coverage sub-areas being associated in the data structure with a cell identity of the serving cell, and at least one of the coverage sub-areas being further associated in the data structure with a cell identity of a neighbor cell; and means for determining a position of the mobile device, the position being within the coverage sub-area of the coverage area of the serving cell.

Clause 60: The apparatus of clause 59, further comprising: means for sending, to a computer system, the cell identity data, wherein the computer system stores the data structure, and wherein determining the position of the mobile device comprises receiving the position from the computer system.

Clause 61: The apparatus of any of clauses 59-60 further comprising means for storing, in a memory of the mobile device the data structure; and means for performing the look up of the data structure from the memory.

Clause 62: The apparatus of clause 59 further comprising means for sending, to a computer system, the cell identity of the serving cell, wherein the computer system stores, for each cell of a plurality of cells, a corresponding data structure that divides a coverage area of the respective cell into coverage sub-areas; and means for receiving, from the computer system and based on the cell identity of the serving cell, the data structure corresponding to the serving cell.

Clause 63: The apparatus of any of clauses 59-62 further comprising prior to receiving the cell identity data: means for determining position data indicating a second position of the mobile device within the coverage area of the serving cell; means for receiving second cell identity data that comprises the cell identity of the serving cell and the cell identity of the neighbor cell; and means for sending, to a computer system, the position data and the second cell identity data, wherein the data structure is generated by the computer system based on the position data and the second cell identity data.

Clause 64: The apparatus of any of clauses 59-63, wherein the data structure represents a map that (i) divides the coverage area of the serving cell into the coverage sub-areas, (ii) maps each one of the coverage sub-areas to a set of cell identities, and (iii) indicates the position of the mobile device as a likely position within each one of the coverage sub-areas, wherein the likely position for each one of the coverage sub-areas is determined based on position data collected from a plurality of mobile devices while being in the respective coverage sub-area.

Clause 65: The apparatus of any of clauses 59-64, wherein the map is associated with at least one of: a mobile network operator, a frequency channel, or a radio access technology.

Clause 66: The apparatus of clause 65, wherein the coverage sub-area associated with the cell identity of the neighbor cell is further associated with a likely position, wherein the cell identity data comprises the cell identity of the neighbor cell, and wherein the position is the likely position.

Clause 67: The apparatus of any of clauses 59-66, wherein the data structure further associates coverage sub-areas of the coverage area with a beam index of the serving cell, a beam index of the neighbor cell, or both.

Clause 68: The apparatus of any of clauses 59-67, wherein the coverage area is associated with a first likely position, wherein the coverage sub-area associated with the cell identity of the neighbor cell is further associated with a second likely position, wherein the cell identity data comprises the cell identity of the neighbor cell, and wherein the position is within the coverage sub-area associated with the cell identity of the neighbor cell and comprises a likely position determined based on the first likely position and the second likely position.

Clause 69: The apparatus of any of clauses 59-68, wherein the coverage sub-areas of the serving cell comprise a number of unique non-overlapping coverage sub-areas, wherein the data structure associates each of the unique non-overlapping coverage sub-areas with the serving cell and with a unique set of neighbor cells.

Clause 70: The apparatus of clause 69, wherein the unique non-overlapping coverage sub-areas comprise a first coverage sub-area associated with the serving cell and the neighbor cell and a second coverage sub-area associated with the serving cell and no neighbor cell.

Clause 71: The apparatus of clause 69, wherein a second coverage sub-area is defined based on first data of a first plurality of mobile devices, wherein a third coverage sub-area is defined based on second data of a second plurality of mobile devices, wherein the first data comprises first mobile device positions and the cell identity of the neighbor cell, wherein the first data excludes a cell identity of an other neighbor cell, and wherein the second data comprises second mobile device positions, the cell identity of the neighbor cell, and the cell identity of the other neighbor cell.

Clause 72: The apparatus of any of clauses 59 or 66-69, wherein the data structure represents a map that (i) divides the coverage area of the serving cell into the coverage sub-areas and (ii) constrains a boundary of each one of the coverage sub-areas to be within a boundary of the coverage area.

Clause 73: The apparatus of any of clauses 59 or 66-69, wherein the data structure represents a map that (i) divides the coverage area of the serving cell into the coverage sub-areas and (ii) constrains a likely mobile device position within each one of the coverage sub-area to be within the coverage area.

Clause 74: The apparatus of any of clauses 59 or 66-69, wherein the data structure represents a map that divides the coverage area of the serving cell into the coverage sub-areas, and wherein the coverage sub-areas are non-overlapping.

Clause 75: The apparatus of any of clauses 59-74, wherein the neighbor cell comprises: a different cell than the serving cell and is on a same frequency channel as the serving cell, a cell on a different frequency channel than the serving cell, a cell on a different radio access technology (RAT) with the same frequency channel as the serving cell, or a cell on a different RAT with a different frequency channel than the serving cell.

Clause 76: An apparatus for determining cell coverage from crowdsourced information received at a cellular entity of a data communication network, the apparatus comprising: means for obtaining, at the cellular entity, cell identity data and position data for a plurality of positions within a coverage area of a serving cell, wherein the cellular entity comprises a mobile device or computer system, and wherein, for each position: the position data includes the respective position, and the cell identity data includes one or more cell identities detected at the respective position of one or more mobile devices; means for storing, with the cellular entity, the position data and the cell identity data; and means for associating coverage sub-areas of the coverage area with cell identities, based on the cell identity data and position data, wherein: each one of the coverage sub-areas is associated in the data structure with a cell identity of the serving cell, and at least one of the coverage sub-areas being further associated in the data structure with a cell identity of a neighbor cell.

Clause 77: The apparatus of clause 76, further comprising means for storing, for each cell of a plurality of cells, a corresponding data structure that divides a coverage area of the respective cell into coverage sub-areas.

Clause 78: The apparatus of any of clauses 76-77 wherein, for at least one position of the plurality of positions, the cell identity data includes a cell identity of the serving cell and a cell identity of at least one the neighbor cell.

Clause 79: The apparatus of any of clauses 76-78, wherein the data structure represents a map that (i) divides the coverage area of the serving cell into the coverage sub-areas, (ii) maps each coverage sub-area to a set of cell identities, and (iii) indicates the position of a target mobile device as a likely position within the coverage sub-area, wherein the likely position is determined based on position data collected from the one or more mobile devices while being in the coverage sub-area.

Clause 80: The apparatus of clause 79, wherein the map is associated with at least one of: a mobile network operator, a frequency channel, or a radio access technology.

Clause 81: The apparatus of any of clauses 76-80, wherein the coverage sub-area associated with the cell identity of the neighbor cell is further associated with a likely position, wherein the cell identity data comprises the cell identity of the neighbor cell, and wherein the position is the likely position.

Clause 82: The apparatus of any of clauses 76-80, wherein the coverage area is associated with a first likely position, wherein the coverage sub-area associated with the cell identity of the neighbor cell is further associated with a second likely position, wherein the cell identity data comprises the cell identity of the neighbor cell, and wherein the position is within the coverage sub-area associated with the cell identity of the neighbor cell and comprises a likely position determined based on the first likely position and the second likely position.

Clause 83: The apparatus of any of clauses 76-80, wherein the coverage sub-areas of the serving cell comprise a number of unique non-overlapping coverage sub-areas, wherein the data structure associates each of the unique non-overlapping coverage sub-areas with the serving cell and with a unique set of neighbor cells.

Clause 84: The apparatus of any of clauses 76-83, wherein the data structure represents a map that (i) divides the coverage area of the serving cell into the coverage sub-areas and (ii) constrains a boundary of each coverage sub-area to be within a boundary of the coverage area.

Clause 85: The apparatus of any of clauses 76-83, wherein the data structure represents a map that (i) divides the coverage area of the serving cell into the coverage sub-areas and (ii) constrains a likely mobile device position within each coverage sub-area to be within the coverage area.

Clause 86: The apparatus of any of clauses 76-85, wherein the neighbor cell comprises: a different cell than the serving cell and is on a same frequency channel as the serving cell, a cell on a different frequency channel than the serving cell, a cell on a different radio access technology (RAT) with the same frequency channel as the serving cell, or a cell on a different RAT with a different frequency channel than the serving cell.

Clause 87: The apparatus of clause 86, wherein the data structure further associates coverage sub-areas of the coverage area with a beam index of the serving cell, a beam index of the neighbor cell, or both.

Clause 88: A non-transitory computer-readable medium storing instructions for positioning a mobile device within a coverage area of a serving cell in communication with the mobile device, the instructions comprising code for: receiving cell identity data, the cell identity data comprising one or more cell identities; and determining a coverage sub-area of the coverage area of the serving cell based on using the cell identity data in a look up of a data structure, the data structure associating coverage sub-areas of the coverage area with cell identities, each one of the coverage sub-areas being associated in the data structure with a cell identity of the serving cell, and at least one of the coverage sub-areas being further associated in the data structure with a cell identity of a neighbor cell; and determining a position of the mobile device, the position being within the coverage sub-area of the coverage area of the serving cell.

Clause 89: The non-transitory computer-readable medium of clause 88, wherein the instructions further comprise code for: sending, to a computer system, the cell identity data, wherein the computer system stores the data structure, and wherein determining the position of the mobile device comprises receiving the position from the computer system.

Clause 90: The non-transitory computer-readable medium of any of clauses 88-89, wherein the instructions further comprise code for: storing, in a memory of the mobile device the data structure; and performing the look up of the data structure from the memory.

Clause 91: The non-transitory computer-readable medium of clause 88, wherein the instructions further comprise code for: sending, to a computer system, the cell identity of the serving cell, wherein the computer system stores, for each cell of a plurality of cells, a corresponding data structure that divides a coverage area of the respective cell into coverage sub-areas; and receiving, from the computer system and based on the cell identity of the serving cell, the data structure corresponding to the serving cell.

Clause 92: The non-transitory computer-readable medium of any of clauses 88-91, wherein the instructions further comprise code for: prior to receiving the cell identity data: determining, by a position sensor of the mobile device, position data indicating a second position of the mobile device within the coverage area of the serving cell; receiving second cell identity data that comprises the cell identity of the serving cell and the cell identity of the neighbor cell; and sending, to a computer system, the position data and the second cell identity data, wherein the data structure is generated by the computer system based on the position data and the second cell identity data.

Clause 93: The non-transitory computer-readable medium of any of clauses 88-92, wherein the data structure represents a map that (i) divides the coverage area of the serving cell into the coverage sub-areas, (ii) maps each one of the coverage sub-areas to a set of cell identities, and (iii) indicates the position of the mobile device as a likely position within each one of the coverage sub-areas, wherein the likely position for each one of the coverage sub-areas is determined based on position data collected from a plurality of mobile devices while being in the respective coverage sub-area.

Clause 94: The non-transitory computer-readable medium of any of clauses 88-93, wherein the map is associated with at least one of: a mobile network operator, a frequency channel, or a radio access technology.

Clause 95: The non-transitory computer-readable medium of clause 94, wherein the coverage sub-area associated with the cell identity of the neighbor cell is further associated with a likely position, wherein the cell identity data comprises the cell identity of the neighbor cell, and wherein the position is the likely position.

Clause 96: The non-transitory computer-readable medium of any of clauses 88-95, wherein the data structure further associates coverage sub-areas of the coverage area with a beam index of the serving cell, a beam index of the neighbor cell, or both.

Clause 97: The non-transitory computer-readable medium of any of clauses 88-96, wherein the coverage area is associated with a first likely position, wherein the coverage sub-area associated with the cell identity of the neighbor cell is further associated with a second likely position, wherein the cell identity data comprises the cell identity of the neighbor cell, and wherein the position is within the coverage sub-area associated with the cell identity of the neighbor cell and comprises a likely position determined based on the first likely position and the second likely position.

Clause 98: The non-transitory computer-readable medium of any of clauses 88-97, wherein the coverage sub-areas of the serving cell comprise a number of unique non-overlapping coverage sub-areas, wherein the data structure associates each of the unique non-overlapping coverage sub-areas with the serving cell and with a unique set of neighbor cells.

Clause 99: The non-transitory computer-readable medium of clause 98, wherein the unique non-overlapping coverage sub-areas comprise a first coverage sub-area associated with the serving cell and the neighbor cell and a second coverage sub-area associated with the serving cell and no neighbor cell.

Clause 100: The non-transitory computer-readable medium of clause 98, wherein a second coverage sub-area is defined based on first data of a first plurality of mobile devices, wherein a third coverage sub-area is defined based on second data of a second plurality of mobile devices, wherein the first data comprises first mobile device positions and the cell identity of the neighbor cell, wherein the first data excludes a cell identity of an other neighbor cell, and wherein the second data comprises second mobile device positions, the cell identity of the neighbor cell, and the cell identity of the other neighbor cell.

Clause 101: The non-transitory computer-readable medium of any of clauses 88 or 95-98, wherein the data structure represents a map that (i) divides the coverage area of the serving cell into the coverage sub-areas and (ii) constrains a boundary of each one of the coverage sub-areas to be within a boundary of the coverage area.

Clause 102: The non-transitory computer-readable medium of any of clauses 88 or 95-98, wherein the data structure represents a map that (i) divides the coverage area of the serving cell into the coverage sub-areas and (ii) constrains a likely mobile device position within each one of the coverage sub-area to be within the coverage area.

Clause 103: The non-transitory computer-readable medium of any of clauses 88 or 95-98, wherein the data structure represents a map that divides the coverage area of the serving cell into the coverage sub-areas, and wherein the coverage sub-areas are non-overlapping.

Clause 104: The non-transitory computer-readable medium of any of clauses 88-103, wherein the neighbor cell comprises: a different cell than the serving cell and is on a same frequency channel as the serving cell, a cell on a different frequency channel than the serving cell, a cell on a different radio access technology (RAT) with the same frequency channel as the serving cell, or a cell on a different RAT with a different frequency channel than the serving cell.

Clause 105: A non-transitory computer-readable medium for determining cell coverage from crowdsourced information received at a cellular entity of a data communication network, the non-transitory computer-readable medium comprising: obtaining, at the cellular entity, cell identity data and position data for a plurality of positions within a coverage area of a serving cell, wherein the cellular entity comprises a mobile device or computer system, and wherein, for each position: the position data includes the respective position, and the cell identity data includes one or more cell identities detected at the respective position of one or more mobile devices; storing, with the cellular entity, the position data and the cell identity data; and associating, by the cellular entity using a data structure, coverage sub-areas of the coverage area with cell identities, based on the cell identity data and position data, wherein: each one of the coverage sub-areas is associated in the data structure with a cell identity of the serving cell, and at least one of the coverage sub-areas being further associated in the data structure with a cell identity of a neighbor cell.

Clause 106: The non-transitory computer-readable medium of clause 105, wherein the instructions further comprise code for storing, for each cell of a plurality of cells, a corresponding data structure that divides a coverage area of the respective cell into coverage sub-areas.

Clause 107: The non-transitory computer-readable medium of any of clauses 105-106 wherein, for at least one position of the plurality of positions, the cell identity data includes a cell identity of the serving cell and a cell identity of at least one the neighbor cell.

Clause 108: The non-transitory computer-readable medium of any of clauses 105-107, wherein the data structure represents a map that (i) divides the coverage area of the serving cell into the coverage sub-areas, (ii) maps each coverage sub-area to a set of cell identities, and (iii) indicates the position of a target mobile device as a likely position within the coverage sub-area, wherein the likely position is determined based on position data collected from the one or more mobile devices while being in the coverage sub-area.

Clause 109: The non-transitory computer-readable medium of clause 108, wherein the map is associated with at least one of: a mobile network operator, a frequency channel, or a radio access technology.

Clause 110: The non-transitory computer-readable medium of any of clauses 105-109, wherein the coverage sub-area associated with the cell identity of the neighbor cell is further associated with a likely position, wherein the cell identity data comprises the cell identity of the neighbor cell, and wherein the position is the likely position.

Clause 111: The non-transitory computer-readable medium of any of clauses 105-109, wherein the coverage area is associated with a first likely position, wherein the coverage sub-area associated with the cell identity of the neighbor cell is further associated with a second likely position, wherein the cell identity data comprises the cell identity of the neighbor cell, and wherein the position is within the coverage sub-area associated with the cell identity of the neighbor cell and comprises a likely position determined based on the first likely position and the second likely position.

Clause 112: The non-transitory computer-readable medium of any of clauses 105-109, wherein the coverage sub-areas of the serving cell comprise a number of unique non-overlapping coverage sub-areas, wherein the data structure associates each of the unique non-overlapping coverage sub-areas with the serving cell and with a unique set of neighbor cells.

Clause 113: The non-transitory computer-readable medium of any of clauses 105-112, wherein the data structure represents a map that (i) divides the coverage area of the serving cell into the coverage sub-areas and (ii) constrains a boundary of each coverage sub-area to be within a boundary of the coverage area.

Clause 114: The non-transitory computer-readable medium of any of clauses 105-112, wherein the data structure represents a map that (i) divides the coverage area of the serving cell into the coverage sub-areas and (ii) constrains a likely mobile device position within each coverage sub-area to be within the coverage area.

Clause 115: The non-transitory computer-readable medium of any of clauses 105-114, wherein the neighbor cell comprises: a different cell than the serving cell and is on a same frequency channel as the serving cell, a cell on a different frequency channel than the serving cell, a cell on a different radio access technology (RAT) with the same frequency channel as the serving cell, or a cell on a different RAT with a different frequency channel than the serving cell.

Clause 116: The non-transitory computer-readable medium of clause 115, wherein the data structure further associates coverage sub-areas of the coverage area with a beam index of the serving cell, a beam index of the neighbor cell, or both.

What is claimed is:

1. A method for positioning a mobile device within a coverage area of a serving cell in communication with the mobile device, the method implemented by the mobile device and comprising:
   receiving cell identity data from one or more of a base station associated with the serving cell or a base station associated with a neighbor cell, the cell identity data comprising one or more cell identities;
   determining a coverage sub-area of the coverage area of the serving cell based on using the cell identity data in a look up of a data structure, the coverage sub-area being defined based at least on geographic or network properties of the serving cell and the neighbor cell, the data structure associating coverage sub-areas of the coverage area with cell identities of at least the serving cell and the neighbor cell, each one of the coverage sub-areas being associated in the data structure with the cell identity of the serving cell, and at least one of the coverage sub-areas being further associated in the data structure with the cell identity of the neighbor cell, wherein the coverage sub-areas of the serving cell comprise a number of unique non-overlapping coverage sub-areas, wherein the data structure associates each of the unique non-overlapping coverage sub-areas with the serving cell and with a unique set of neighbor cells; and
   determining a position of the mobile device, the position being within the coverage sub-area of the coverage area of the serving cell.

2. The method of claim 1, further comprising:
   sending, to a computer system, the cell identity data, wherein the computer system stores the data structure, and wherein determining the position of the mobile device comprises receiving the position from the computer system.

3. The method of claim 1, further comprising:
   storing, in a memory of the mobile device, the data structure; and
   performing the look up of the data structure from the memory.

4. The method of claim 3, further comprising:
   sending, to a computer system, the cell identity of the serving cell, wherein the computer system stores, for each cell of a plurality of cells, a corresponding data structure that divides a coverage area of a respective cell into coverage sub-areas; and
   receiving, from the computer system and based on the cell identity of the serving cell, the data structure corresponding to the serving cell.

5. The method of claim 1, further comprising:
   prior to receiving the cell identity data:
      determining, by a position sensor of the mobile device, position data indicating a second position of the mobile device within the coverage area of the serving cell;
      receiving second cell identity data that comprises the cell identity of the serving cell and the cell identity of the neighbor cell; and
      sending, to a computer system, the position data and the second cell identity data, wherein the data structure is generated by the computer system based on the position data and the second cell identity data.

6. The method of claim 1, wherein the data structure represents a map that (i) divides the coverage area of the serving cell into the coverage sub-areas, (ii) maps each one of the coverage sub-areas to a set of cell identities, and (iii) indicates the position of the mobile device as a likely position within each one of the coverage sub-areas, wherein the likely position for each one of the coverage sub-areas is determined based on position data collected from a plurality of mobile devices while being in a respective coverage sub-area.

7. The method of claim 6, wherein the map is associated with at least one of: a mobile network operator, a frequency channel, or a radio access technology.

8. The method of claim 1, wherein the coverage sub-area associated with the cell identity of the neighbor cell is further associated with a likely position, wherein the cell identity data comprises the cell identity of the neighbor cell, and wherein the position is the likely position.

9. The method of claim 1, wherein the data structure further associates coverage sub-areas of the coverage area with a beam index of the serving cell, a beam index of the neighbor cell, or both.

10. The method of claim 1, wherein the coverage area is associated with a first likely position, wherein the coverage sub-area associated with the cell identity of the neighbor cell is further associated with a second likely position, wherein the cell identity data comprises the cell identity of the neighbor cell, and wherein the position is within the coverage sub-area associated with the cell identity of the neighbor cell and comprises a likely position determined based on the first likely position and the second likely position.

11. The method of claim 1, wherein the unique non-overlapping coverage sub-areas comprise a first coverage sub-area associated with the serving cell and the neighbor cell and a second coverage sub-area associated with the serving cell and no neighbor cell.

12. The method of claim 1, wherein a second coverage sub-area is defined based on first data of a first plurality of mobile devices, wherein a third coverage sub-area is defined based on second data of a second plurality of mobile devices, wherein the first data comprises first mobile device positions and the cell identity of the neighbor cell, wherein the first data excludes a cell identity of an other neighbor cell, and wherein the second data comprises second mobile device positions, the cell identity of the neighbor cell, and the cell identity of the other neighbor cell.

13. The method of claim 1, wherein the data structure represents a map that divides the coverage area of the serving cell into the coverage sub-areas and (ii) constrains a boundary of each one of the coverage sub-areas to be within a boundary of the coverage area.

14. The method of claim 1, wherein the data structure represents a map that (i) divides the coverage area of the serving cell into the coverage sub-areas and (ii) constrains a likely mobile device position within each one of the coverage sub-area to be within the coverage area.

15. The method of claim 1, wherein the data structure represents a map that divides the coverage area of the serving cell into the coverage sub-areas, and wherein the coverage sub-areas are non-overlapping.

16. The method of claim 1, wherein the neighbor cell comprises:
   a different cell than the serving cell and is on a same frequency channel as the serving cell, a cell on a different frequency channel than the serving cell, a cell on a different radio access technology (RAT) with the same frequency channel as the serving cell, or a cell on a different RAT with a different frequency channel than the serving cell.

17. A mobile device for positioning the mobile device within a coverage area of a serving cell in communication with the mobile device, the mobile device comprising:

a transceiver;

a memory; and one or more processing units communicatively coupled with the transceiver and the memory, wherein the one or more processing units are configured to:

receive cell identity data via the transceiver from one or more of a base station associated with the serving cell or a base station associated with a neighbor cell, the cell identity data comprising one or more cell identities;

determine a coverage sub-area of the coverage area of the serving cell based on using the cell identity data in a look up of a data structure, the coverage sub-area being defined based at least on geographic or network properties of the serving cell and the neighbor cell, the data structure associating coverage sub-areas of the coverage area with cell identities of at least the serving cell and the neighbor cell, each one of the coverage sub-areas being associated in the data structure with the cell identity of the serving cell, and at least one of the coverage sub-areas being further associated in the data structure with the cell identity of the neighbor cell, wherein the coverage sub-areas of the serving cell comprise a number of unique non-overlapping coverage sub-areas, wherein the data structure associates each of the unique non-overlapping coverage sub-areas with the serving cell and with a unique set of neighbor cells; and determine a position of the mobile device, the position being within the coverage sub-area of the coverage area of the serving cell.

18. The mobile device of claim 17, wherein the one or more processing units are further configured to:

send, to a computer system, the cell identity data, wherein the computer system stores the data structure, and wherein determining the position of the mobile device comprises receiving the position from the computer system.

19. The mobile device of claim 17, wherein the one or more processing units are further configured to:

store, in the memory, the data structure; and perform the look up of the data structure from the memory.

20. The mobile device of claim 19, wherein the one or more processing units are further configured to:

send, to a computer system, the cell identity of the serving cell, wherein the computer system stores, for each cell of a plurality of cells, a corresponding data structure that divides a coverage area of a respective cell into coverage sub-areas; and receive, from the computer system and based on the cell identity of the serving cell, the data structure corresponding to the serving cell.

21. The mobile device of claim 17, wherein the one or more processing units are further configured to:

prior to receiving the cell identity data:

determine position data indicating a second position of the mobile device within the coverage area of the serving cell;

receive second cell identity data that comprises the cell identity of the serving cell and the cell identity of the neighbor cell; and send, to a computer system, the position data and the second cell identity data, wherein the data structure is generated by the computer system based on the position data and the second cell identity data.

22. The mobile device of claim 17, wherein the data structure represents a map that (i) divides the coverage area of the serving cell into the coverage sub-areas, (ii) maps each one of the coverage sub-areas to a set of cell identities, and (iii) indicates the position of the mobile device as a likely position within each one of the coverage sub-areas, wherein the likely position for each one of the coverage sub-areas is determined based on position data collected from a plurality of mobile devices while being in a respective coverage sub-area.

23. The mobile device of claim 22, wherein the map is associated with at least one of: a mobile network operator, a frequency channel, or a radio access technology.

24. The mobile device of claim 17, wherein the coverage sub-area associated with the cell identity of the neighbor cell is further associated with a likely position, wherein the cell identity data comprises the cell identity of the neighbor cell, and wherein the position is the likely position.

25. The mobile device of claim 17, wherein the data structure further associates coverage sub-areas of the coverage area with a beam index of the serving cell, a beam index of the neighbor cell, or both.

26. The mobile device of claim 17, wherein the coverage area is associated with a first likely position, wherein the coverage sub-area associated with the cell identity of the neighbor cell is further associated with a second likely position, wherein the cell identity data comprises the cell identity of the neighbor cell, and wherein the position is within the coverage sub-area associated with the cell identity of the neighbor cell and comprises a likely position determined based on the first likely position and the second likely position.

27. The mobile device of claim 17, wherein the unique non-overlapping coverage sub-areas comprise a first coverage sub-area associated with the serving cell and the neighbor cell and a second coverage sub-area associated with the serving cell and no neighbor cell.

28. The mobile device of claim 17, wherein a second coverage sub-area is defined based on first data of a first plurality of mobile devices, wherein a third coverage sub-area is defined based on second data of a second plurality of mobile devices, wherein the first data comprises first mobile device positions and the cell identity of the neighbor cell, wherein the first data excludes a cell identity of an other neighbor cell, and wherein the second data comprises second mobile device positions, the cell identity of the neighbor cell, and the cell identity of the other neighbor cell.

29. The mobile device of claim 17, wherein the data structure represents a map that (i) divides the coverage area of the serving cell into the coverage sub-areas and (ii) constrains a boundary of each one of the coverage sub-areas to be within a boundary of the coverage area.

30. The mobile device of claim 17, wherein the data structure represents a map that (i) divides the coverage area of the serving cell into the coverage sub-areas and (ii) constrains a likely mobile device position within each one of the coverage sub-area to be within the coverage area.

31. The mobile device of claim 17, wherein the data structure represents a map that divides the coverage area of the serving cell into the coverage sub-areas, and wherein the coverage sub-areas are non-overlapping.

32. The mobile device of claim 17, wherein the neighbor cell comprises:
- a different cell than the serving cell and is on a same frequency channel as the serving cell,
- a cell on a different frequency channel than the serving cell,
- a cell on a different radio access technology (RAT) with the same frequency channel as the serving cell, or
- a cell on a different RAT with a different frequency channel than the serving cell.

33. An apparatus for positioning a mobile device within a coverage area of a serving cell in communication with the mobile device, the apparatus comprising:
- means for receiving cell identity data from one or more of a base station associated with the serving cell or a base station associated with a neighbor cell, the cell identity data comprising one or more cell identities;
- means for determining a coverage sub-area of the coverage area of the serving cell based on using the cell identity data in a look up of a data structure, the coverage sub-area being defined based at least on geographic or network properties of the serving cell and the neighbor cell, the data structure associating coverage sub-areas of the coverage area with cell identities of at least the serving cell and the neighbor cell, each one of the coverage sub-areas being associated in the data structure with the cell identity of the serving cell, and at least one of the coverage sub-areas being further associated in the data structure with the cell identity of the neighbor cell, wherein the coverage sub-areas of the serving cell comprise a number of unique non-overlapping coverage sub-areas, wherein the data structure associates each of the unique non-overlapping coverage sub-areas with the serving cell and with a unique set of neighbor cells; and
- means for determining a position of the mobile device, the position being within the coverage sub-area of the coverage area of the serving cell.

34. The apparatus of claim 33, further comprising:
- means for sending, to a computer system, the cell identity data, wherein the computer system stores the data structure, and wherein determining the position of the mobile device comprises receiving the position from the computer system.

35. A non-transitory computer-readable medium storing instructions for positioning a mobile device within a coverage area of a serving cell in communication with the mobile device, the instructions comprising code for:
- receiving cell identity data from one or more of a base station associated with the serving cell or a base station associated with a neighbor cell, the cell identity data comprising one or more cell identities;
- determining a coverage sub-area of the coverage area of the serving cell based on using the cell identity data in a look up of a data structure, the coverage sub-area being defined based at least on geographic or network properties of the serving cell and the neighbor cell, the data structure associating coverage sub-areas of the coverage area with cell identities of at least the serving cell and the neighbor cell, each one of the coverage sub-areas being associated in the data structure with the cell identity of the serving cell, and at least one of the coverage sub-areas being further associated in the data structure with the cell identity of the neighbor cell, wherein the coverage sub-areas of the serving cell comprise a number of unique non-overlapping coverage sub-areas, wherein the data structure associates each of the unique non-overlapping coverage sub-areas with the serving cell and with a unique set of neighbor cells; and
- determining a position of the mobile device, the position being within the coverage sub-area of the coverage area of the serving cell.

* * * * *